United States Patent
Novotny

(10) Patent No.: US 11,586,945 B2
(45) Date of Patent: Feb. 21, 2023

(54) METHODS AND SYSTEMS FOR AUTOMATED, INTELLIGENT APPLICATION PROCESS DEVELOPMENT THAT RECOMMEND HOW TO MODIFY APPLICATIONS BASED ON USAGE PATTERNS OF END USERS

(71) Applicant: salesforce.com, inc., San Francisco, CA (US)

(72) Inventor: Axella Novotny, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 723 days.

(21) Appl. No.: 16/554,474

(22) Filed: Aug. 28, 2019

(65) Prior Publication Data
US 2021/0042638 A1 Feb. 11, 2021

Related U.S. Application Data

(60) Provisional application No. 62/883,518, filed on Aug. 6, 2019.

(51) Int. Cl.
*G06F 11/34* (2006.01)
*H04L 67/50* (2022.01)
(Continued)

(52) U.S. Cl.
CPC .............. *G06N 5/04* (2013.01); *G06F 8/77* (2013.01); *G06F 11/302* (2013.01);
(Continued)

(58) Field of Classification Search
CPC ........ G06N 5/04; G06N 20/00; H04L 67/535; G06F 8/77; G06F 11/3006; G06F 11/302; G06F 11/3438; G06F 8/10
See application file for complete search history.

(56) References Cited

U.S. PATENT DOCUMENTS 5,577,188 A 11/1996 Zhu
5,608,872 A 3/1997 Schwartz et al.
(Continued)

*Primary Examiner* — Beau D Spratt
(74) *Attorney, Agent, or Firm* — LKGlobal | Lorenz & Kopf, LLP

(57) ABSTRACT

Methods and systems are provided for modifying an application provided by a cloud-based computing system. The application is used by end users of an organization that is part of the cloud-based computing system. A clickstream monitoring module monitors a clickstream generated by each end user as that end user interacts with the application to generate a set of clickstream data for that particular end user. Each set of clickstream data indicates a path of interaction with features of the application by a particular end user. The sets of clickstream data can then be processed at an analytics engine to extract usage patterns that indicate how end users interact with different features of the application during usage of the application. The extracted usage patterns indicate which features the end users interact with and in what order. An artificial intelligence engine can then generate, based on the extracted usage patterns, at least one recommendation for modifying one or more features of the application to tailor the application for use by the end users in view of the extracted usage patterns.

19 Claims, 13 Drawing Sheets

(51) Int. Cl.
*G06N 5/04* (2023.01)
*G06N 20/00* (2019.01)
*G06F 11/30* (2006.01)
*G06F 8/77* (2018.01)
*G06F 8/10* (2018.01)

(52) U.S. Cl.
CPC ...... *G06F 11/3006* (2013.01); *G06F 11/3438* (2013.01); *G06N 20/00* (2019.01); *H04L 67/535* (2022.05); *G06F 8/10* (2013.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |

(56) References Cited

U.S. PATENT DOCUMENTS

| | | | |
|---|---|---|---|
| 2012/0218958 A1 | 8/2012 | Rangaiah | |
| 2012/0233137 A1 | 9/2012 | Jakobson et al. | |
| 2012/0278331 A1* | 11/2012 | Campbell | H04N 21/44204 |
| | | | 707/E17.09 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2014/0164178 A1* | 6/2014 | Adjaoute | G06Q 30/0609 |
| | | | 705/26.35 |
| 2017/0344895 A1* | 11/2017 | Roy | G06F 3/0484 |
| 2018/0364879 A1* | 12/2018 | Adam | G06F 3/0484 |
| 2019/0361579 A1* | 11/2019 | Srivastava | G06F 9/451 |

\* cited by examiner

METHODS AND SYSTEMS FOR AUTOMATED, INTELLIGENT APPLICATION PROCESS DEVELOPMENT THAT RECOMMEND HOW TO MODIFY APPLICATIONS BASED ON USAGE PATTERNS OF END USERS

CROSS-REFERENCE TO RELATED APPLICATION

This application claims the benefit of U.S. Provisional Application No. 62/883,518, filed Aug. 6, 2019, which is incorporated herein by reference in its entirety.

TECHNICAL FIELD

Embodiments of the subject matter described herein relate generally to cloud-based computing. More particularly, embodiments of the subject matter relate to methods and systems for intelligent application process development that can recommend how to modify applications based on usage patterns of end users provided through click paths as the end users access various parts of the application.

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. "Cloud computing" services provide shared resources, software, and information to computers and other devices upon request. In cloud computing environments, software can be accessible over the Internet rather than installed locally on in-house computer systems. This "cloud" computing model allows applications to be provided over a platform "as a service" supplied by the infrastructure provider. The infrastructure provider typically abstracts the underlying hardware and other resources used to deliver a customer-developed application so that the customer no longer needs to operate and support dedicated server hardware. Cloud computing typically involves over-the-Internet provision of dynamically scalable and often virtualized resources. Technological details can be abstracted from the users, who no longer have need for expertise in, or control over, the technology infrastructure "in the cloud" that supports them. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without compromising data security. Generally speaking, multi-tenancy refers to a system where a single hardware and software platform simultaneously supports multiple organizations or tenants from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application feature software between multiple sets of users.

In general, businesses use a customer relationship management (CRM) system (also referred to as a database system or system) to manage business relationships and information associated with the business relationship. For example, a multi-tenant system may support an on-demand CRM application that manages the data for a particular organization's sales staff that is maintained by the multi-tenant system and facilitates collaboration among members of that organization's sales staff (e.g., account executives, sales representatives, and the like). This data may include customer and prospect contact information, accounts, leads, and opportunities in one central location. The information may be stored in a database as objects. For example, the CRM system may include "account" object, "contact" object and "opportunities" object.

There is often a disconnect between how applications are developed on platforms and how end users interact with those applications. In many cases developers fail to understand how their end users will actually use the application. For example, while developers and administrators can go to great lengths to provide prescriptive guidance on how a record should be populated, how end users interact with these applications is sometime not understood. For instance, a large number of sales users may only complete the same four fields on a 15-field record. The additional fields on the record are considered "nice to have" by the application development team, but the sales users find them to be unnecessary when creating sales records. In order to build more useful applications, administrators and developers must be in the mindset of their end users. When this is not feasible they must rely on other methods for application development or seek the recommendations of consulting partners.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
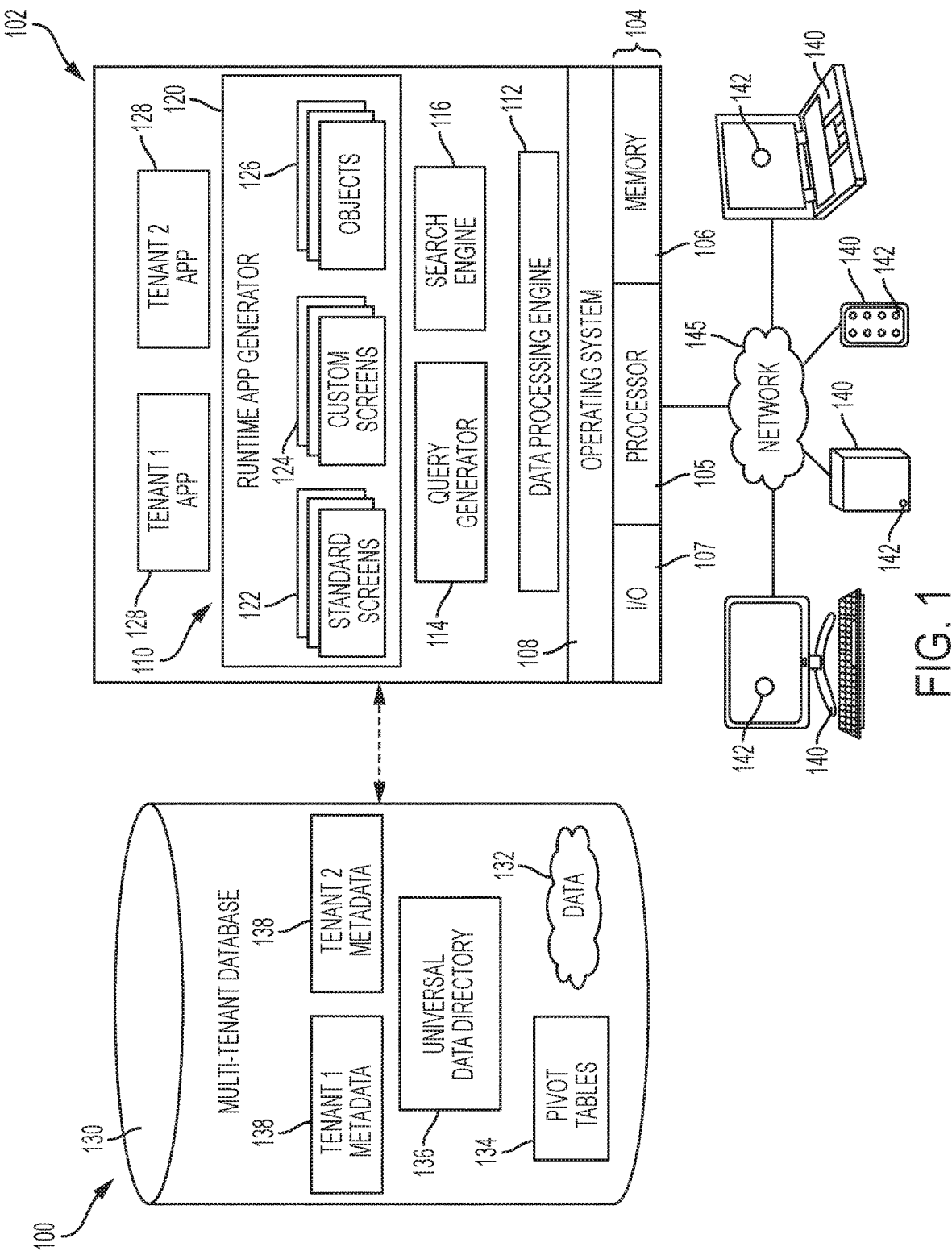
FIG. 1 is a schematic block diagram of an example of a multi-tenant computing environment in which features of the disclosed embodiments can be implemented in accordance with some of the disclosed embodiments.

In life cycle development of applications, end users may sometimes not be forthcoming with accurate information when it comes to explaining how they interact with a system in order to perform their daily tasks. In order to get a more accurate picture of how end users interact with applications, their actions must be observed. Application developers create an application based on the input they receive from end users even if this information is incorrect or paints an incomplete picture of how an end user actually interacts with the application. In addition, development teams are not always aware of all the technical offerings a platform may provide in order to improve how end users interact with applications. Yet, developers may make assumptions when it comes to creating applications and sometimes these assumptions can be very inaccurate.

A clickstream is a record that contains data about an end user's clicks on a computer display screen (e.g., via a mouse or touchpad). This data can provide a trail of an end user's real-time interaction or activity with an application. Stated differently, a clickstream can represent a path an end user takes when interacting with an application (e.g., a set or series of actions taken by an end user when interacting with the application). For example, this can include tracking data about which application features (e.g., fields, buttons, links, pages, etc.) an end user interacts with and in what order. Clickstream analysis (also called clickstream analytics) can refer to the process of collecting, analyzing and reporting aggregate data about which application features (e.g., fields, buttons, links, pages, etc.) one or more end users interact with and in what order.

Methods and systems are provided for intelligent application process development that can recommend how to modify applications based on end user data points from end users provided through clickstreams or click paths as the end users access various parts of application or platform. Clickstreams from the various end users can allow data on the behavior of end users to be observed and collected. This data indicates how end user interact with applications on a daily basis. The methods and systems can track actions by end users (e.g., the click paths of users), and use predictive analytic capabilities to provide a prescriptive solution on how to best design existing applications. The clickstream data can then be interpreted and used to generate recommendations that are aligned to application feature enhancements and reconfigurations of the existing applications in order to improve any interaction processes that may be unnecessary, disjointed, or inaccurate. In other words, recommendations can be generated based on the system input received from end users. The system is the observer that catalogues the data points and provides recommended solutions based on capabilities of the system. For example, an AI engine can generate recommendations on how to improve applications that reside on and that are provided by a cloud computing platform. The AI engine can utilize metadata to improve platform adoption, development, and ease of use. Metadata can represent a structure of a container for data it will contain. Metadata could be, for example, a custom tab, object, flow, process, or any data structure that is using and/or storing data. End users can interact with a metadata layer by creating custom tables, fields, flows, processes, etc. that will work in conjunction with their data. For example, an object in an instance is metadata it represents a table in its simplest of forms. The object contains records associated with it that contain customer data. In some cases, a custom object can be created to store data and that object could exist with other custom objects within a custom application. Alternatively, metadata can be tables that used to provide data structures, or a form that is created and populated with data.

The recommendation(s) provided can vary depending on the implementation. For example, in one embodiment, the recommendations provided can include suggested modifications to an existing process (in accordance with which the end users interact with the application) to result in a modified process (in accordance with which the end users interact with the application) to improve or simplify the end users interaction with the application (e.g., a new process to remove repetitive actions for end-users). For instance, as one non-limiting example, a recommendation could provide a suggestion on how to improve an end user's interaction with the system, such as, creating a process flow to limit the amount of work a user needs to complete in order to submit a record. For example, "I see your users are only completing these fields on these records, would you like me to show you some process builder examples, that can speed up the data entry process for them?" In another embodiment, the recommendations provided by the system alert can include suggested modifications to an existing process workflow (in accordance with which the end users interact with the application) to result in a modified process workflow (in accordance with which the end users interact with the application) to reduce a number of steps required to perform or complete a task, a job or an action when the end users interact with the application.

In another embodiment, the recommendations provided can include a new process (in accordance with which the end users interact with the application) to improve or simplify the end users interaction with the application (e.g., a new process to remove repetitive actions for end-users). As used herein, a process can include a series of actions or steps within the application. In another embodiment, the recommendations provided can include suggestion(s) for a new process flow in accordance with which the end users interact with the application. As used herein, a process flow can refer to a series of declarative automation steps that includes configured logic and actions for a business process based on the input from end users. In another embodiment, the recommendations provided by the system alert can include a new process workflow (in accordance with which the end users interact with the application) to perform or complete a task, a job or an action when the end users interact with the application. As used herein, a process workflow can refer to a set of instructions using if/then statements within a container that can automate standard internal procedures and processes enabling end users to save time. When a record meets certain criteria, the rule's actions found within a workflow can be executed.

In another embodiment, the recommendations provided can include suggestions for modifications to feature(s) of the application. For example, the suggestions for modifications to feature(s) of the application can includes suggestions for modifications can include recommendation(s) that suggest whether one or more input controls of the application are presented within the application, or an order in which input control(s) of the application are presented to the end users of the application; recommendation(s) that suggest whether one or more navigational component(s) of the application are presented within the application, or an order in which navigational component(s) of the application are presented to the end users of the application; recommendation(s) that suggest whether one or more informational component(s) of the application are presented within the application, or an order in which informational component(s) of the application are presented to the end users of the application; recommendation(s) that suggest whether one or more container(s) of the application are presented within the application, or an order in which container(s) of the application are presented to the end users of the application; recommendation(s) that suggest whether one or more page(s) of the application are presented within the application, or an order in which page(s) of the application are presented to the end users of the application; recommendation(s) that suggest whether one or more field(s) of the application are presented within the application, or an order in which field(s) of the application are presented to the end users of the application, etc.

In another embodiment, the recommendations provided can include suggestions for new feature(s) of the application (e.g., recommendation(s) that suggest one or more input controls for the application and/or an order in which input control(s) are presented to the end users of the application; recommendation(s) that suggest one or more navigational component(s) for the application and/or an order in which navigational component(s) are presented to the end users of the application; recommendation(s) that suggest one or more informational component(s) for the application and/or an order in which informational component(s) are presented to the end users of the application; recommendation(s) that suggest one or more container(s) for the application and/or an order in which container(s) are presented to the end users of the application; recommendation(s) that suggest one or more page(s) for the application and/or an order in which page(s) are presented to the end users of the application; recommendation(s) that suggest one or more field(s) for the application and/or an order in which field(s) of the application are presented to the end users of the application, etc.) In another embodiment, the recommendations can include any combination of the above.

As some non-limiting examples, the AI engine could use extracted usage patterns of end users to create a process, recommend a process template, or recommend creating a quick action on a record based on the click paths of the end users. The AI engine can recommend simpler design patterns by looking at metadata and generating recommendations on how to improve overall processes whether it be by modifying an existing process or flow within the application, by creating a new process or flow within the application or separate from the application, by creating a new workflow or modifying an existing workflow to create a modified workflow, by modifying permissions or profiles, by creating a new set of permissions or profiles, by modifying existing platform features (e.g., objects, tabs, custom applications, custom workflows, lightning flows, validation rules, etc.), by creating new platform features (e.g., objects, tabs, custom applications, custom workflows, lightning flows, validation rules, etc.), by changing how data is funneled into a cloud computing platform, etc. The cloud computing platform allows a developer or system administrator to develop custom data models and applications for desktop and mobile environments. These recommendations can suggest the best way to modify existing applications on the platform, and thus guide administrators and developers to maximize the efficiency of their metadata designs. The AI engine can also track whether end users are uploading data sets to the cloud computing platform, and if so, provide recommendations to developers to avoid the need for uploading data sets to the cloud computing platform. To explain further, most, if not all, major cloud computing platforms have some type of data transfer application that allows an end user to manually upload data to the desired end point (platform). The process is time consuming and prone to errors, that is why it is generally not recommend, but a lot of customers extract, transform, load (ETL) data if they are unfamiliar with how application programming interface (API) calls work. As one non-limiting example of an extract, transform, load (ETL) process, an end user might extract a data set from a SQL database in the form a CSV document, and then modify the data in the CSV document, then upload the data set to the platform via data loader or some other data transfer application. As such, the click paths end users take throughout can guide development teams on how to improve their existing applications.

FIG. 1 is a schematic block diagram of an example of a multi-tenant computing environment in which features of the disclosed embodiments can be implemented in accordance with the disclosed embodiments. As shown in FIG. 1, an exemplary cloud-based solution may be implemented in the context of a multi-tenant system 100 including a server 102 that supports applications 128 based upon data 132 from a database 130 that may be shared between multiple tenants, organizations, or enterprises, referred to herein as a multi-tenant database. The multi-tenant system 100 can be shared by many different organizations, and handles the storage of, and access to, different metadata, objects, data and applications across disparate organizations. In one embodiment, the multi-tenant system 100 can be part of a database system, such as a multi-tenant database system.

The multi-tenant system 100 can provide applications and services and store data for any number of organizations. Each organization is a source of metadata and data associated with that metadata that collectively make up an application. In one implementation, the metadata can include customized content of the organization (e.g., customizations done to an instance that define business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, automation rules and processes, etc. Data is associated with metadata to create an application. Data can be stored as one or more objects, where each object holds particular records for an organization. As such, data can include records (or user content) that are held by one or more objects.

The multi-tenant system 100 allows users of user systems 140 to establish a communicative connection to the multi-tenant system 100 over a network 145 such as the Internet or any type of network described herein. Based on a user's interaction with a user system 140, the application platform 110 accesses an organization's data (e.g., records held by an object) and metadata that is stored at one or more database systems 130, and provides the user system 140 with access to applications based on that data and metadata. These applications are executed or run in a process space of the application platform 110 will be described in greater detail below. The user system 140 and various other user systems (not illustrated) can interact with the applications provided by the multi-tenant system 100. The multi-tenant system 100 is configured to handle requests for any user associated with any organization that is a tenant of the system. Data and services generated by the various applications 128 are provided via a network 145 to any number of user systems 140, such as desktops, laptops, tablets, smartphones or other client devices, Google Glass™, and any other computing device implemented in an automobile, aircraft, television, or other business or consumer electronic device or system, including web clients.

Each application 128 is suitably generated at run-time (or on-demand) using a common application platform 110 that securely provides access to the data 132 in the database 130 for each of the various tenant organizations subscribing to the system 100. The application platform 110 has access to one or more database systems 130 that store information (e.g., data and metadata) for a number of different organizations including user information, organization information, custom information, etc. The database systems 130 can include a multi-tenant database system 130 as described with reference to FIG. 1, as well as other databases or sources of information that are external to the multi-tenant database system 130 of FIG. 1. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that share access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The server 102, application platform 110 and database systems 130 can be part of one backend system. Although not illustrated, the multi-tenant system 100 can include other backend systems that can include one or more servers that work in conjunction with one or more databases and/or data processing components, and the application platform 110 can access the other backend systems.

The multi-tenant system 100 includes one or more user systems 140 that can access various applications provided by the application platform 110. The application platform 110 is a cloud-based user interface. The application platform 110 can be any sort of software application or other data processing engine that generates the virtual applications 128 that provide data and/or services to the user systems 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the user systems 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the user systems 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its user system 140, as appropriate.

The runtime application generator 120 suitably interacts with the query generator 114 to efficiently obtain multi-tenant data 132 from the database 130 as needed in response to input queries initiated or otherwise provided by users of the user systems 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled user system 140 on the network 145. In an exemplary embodiment, the user system 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the user system 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

As noted above, the virtual application 128 may contain Java, ActiveX, or other content that can be presented using conventional client software running on the user system 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

Objects, Records, and Archive Records

In one embodiment, the multi-tenant database system 130 can store data in the form of records and customizations. As used herein, the term "record" can refer to a particular occurrence or instance of a data object that is created by a user or administrator of a database service and stored in a database system, for example, about a particular (actual or potential) business relationship or project.

An object can refer to a structure used to store data and associated metadata along with a globally unique identifier (called an identity field) that allows for retrieval of the object. In one embodiment implementing a multi-tenant database, all of the records for the tenants have an identifier stored in a common table. Each object comprises a number of fields. A record has data fields that are defined by the structure of the object (e.g. fields of certain data types and purposes). An object is analogous to a database table, fields of an object are analogous to columns of the database table, and a record is analogous to a row in a database table. Data is stored as records of the object, which correspond to rows in a database. The terms "object" and "entity" are used interchangeably herein. Objects not only provide structure for storing data, but can also power the interface elements that allow users to interact with the data, such as tabs, the layout of fields on a page, and lists of related records. Objects can also have built-in support for features such as access management, validation, formulas, triggers, labels, notes and attachments, a track field history feature, security features, etc. Attributes of an object are described with metadata, making it easy to create and modify records either through a visual interface or programmatically.

A record can also have custom fields defined by a user. A field can be another record or include links thereto, thereby providing a parent-child relationship between the records. Customizations can include custom objects and fields, Apex Code, Visualforce, Workflow, etc.

Examples of objects include standard objects, custom objects, and external objects. A standard object can have a pre-defined data structure that is defined or specified by a database service or cloud computing platform. A standard object can be thought of as a default object. For example, in one embodiment, a standard object includes one or more pre-defined fields that are common for each organization that utilizes the cloud computing platform or database system or service.

A few non-limiting examples of different types of standard objects can include sales objects (e.g., accounts, contacts, opportunities, leads, campaigns, and other related objects); task and event objects (e.g., tasks and events and their related objects); support objects (e.g., cases and solutions and their related objects); salesforce knowledge objects (e.g., view and vote statistics, article versions, and other related objects); document, note, attachment objects and their related objects; user, sharing, and permission objects (e.g., users, profiles, and roles); profile and permission objects (e.g., users, profiles, permission sets, and related permission objects); record type objects (e.g., record types and business processes and their related objects); product and schedule objects (e.g., opportunities, products, and schedules); sharing and team selling objects (e.g., account teams, opportunity teams, and sharing objects); customizable forecasting objects (e.g., includes forecasts and related objects); forecasts objects (e.g., includes objects for collaborative forecasts); territory management (e.g., territories and related objects associated with territory management); process objects (e.g., approval processes and related objects); content objects (e.g., content and libraries and their related objects); chatter feed objects (e.g., objects related to feeds); badge and reward objects; feedback and performance cycle objects, etc. For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is trying working on.

By contrast, a custom object can have a data structure that is defined, at least in part, by an organization or by a user/subscriber/admin of an organization. For example, a custom object can be an object that is custom defined by a user/subscriber/administrator of an organization, and includes one or more custom fields defined by the user or the particular organization for that custom object. Custom objects are custom database tables that allow an organization to store information unique to their organization. Custom objects can extend the functionality that standard objects provide.

In one embodiment, an object can be a relationship management entity having a record type defined within platform that includes a customer relationship management (CRM) database system for managing a company's relationships and interactions with their customers and potential customers. Examples of CRM entities can include, but are not limited to, an account, a case, an opportunity, a lead, a project, a contact, an order, a pricebook, a product, a solution, a report, a forecast, a user, etc. For instance, an opportunity can correspond to a sales prospect, marketing project, or other business related activity with respect to which a user desires to collaborate with others.

External objects are objects that an organization creates that map to data stored outside the organization. External objects are like custom objects, but external object record data is stored outside the organization. For example, data that's stored on premises in an enterprise resource planning (ERP) system can be accessed as external objects in real time via web service callouts, instead of copying the data into the organization.

Figure 2:
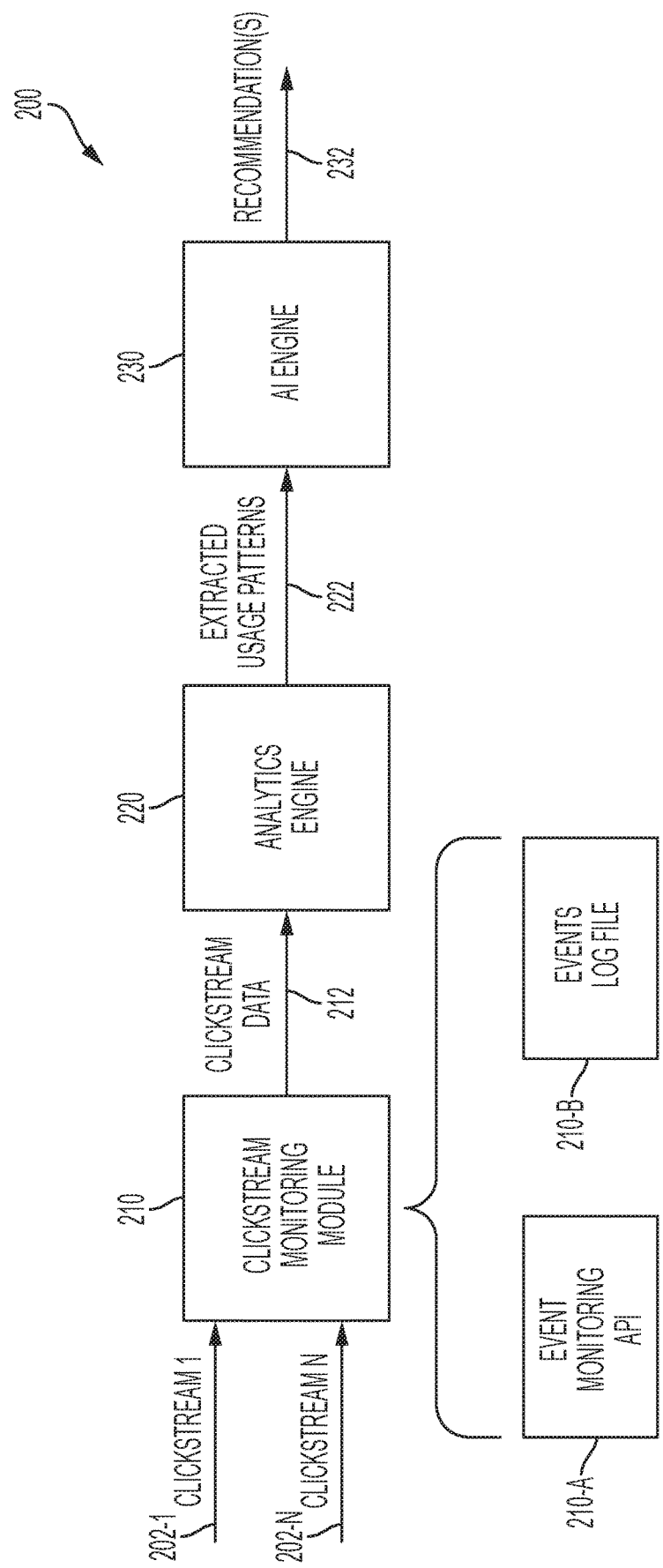
FIG. 2 is a block diagram of an automated, intelligent application process development system in accordance with the disclosed embodiments.

FIG. 2 is a block diagram of an automated, intelligent application process development system 200 in accordance with the disclosed embodiments. Although a single instance of the system 200 is shown in FIG. 2, it should be appreciated that a cloud-based computing system, such as a multi-tenant system 100 of FIG. 1, can include at least one instance of the system 200 for each organization or tenant that is part of the cloud-based computing system. The system 200 includes a clickstream monitoring module 210, an analytics engine 220, and an artificial intelligence engine 230.

The clickstream monitoring module 210 monitors clickstreams 202-1 . . . 202-N generated by each end user as that end user interacts with an application to generate a set of clickstream data 212 for each particular end user. A clickstream is a record that contains data about an end user's clicks on a computer display screen (e.g., via a mouse or touchpad). This data can provide a trail of an end user's real-time interaction or activity with an application. Stated differently, a clickstream can represent a path an end user takes when interacting with an application (e.g., a set or series of actions taken by an end user when interacting with the application). For example, this can include tracking data about which application features (e.g., fields, buttons, links, pages, etc.) an end user interacts with and in what order. The set of clickstream data 212 collectively indicate a path of action or interaction with features of the application by each particular end user while they interact with the application.

In one embodiment, the clickstream monitoring module 210 can include an event monitoring API 210-A for each organization. The event monitoring API 210-A monitors or tracks the various clickstreams 202 and generates at least one events log file 210-B that stores or "logs" events from the various clickstreams 202. The events stored in the events log file(s) 210-B can represent and can be referred to as clickstream data 212. For example, events can be data points collected by the system that indicate which features (e.g., fields, buttons, links, pages, etc.) the end users interact with and in what order, and can collectively represent usage patterns that reflect the end users interaction with the application. As will be described below, the clickstream data stored in the events log file(s) 210-B can then be utilized by other elements 220, 230 of the system 200 for various purposes as will be described below. Depending on the implementation, the events log file 210-B can be stored at the clickstream monitoring module 210 or in external storage, and is accessible by other entities including the analytics engine 220. For example, the analytics engine 220 can to extract usage patterns that include data that indicate which features (e.g., fields, buttons, links, pages, etc.) the end users interact with and in what order.

As used herein, the terms "interaction" and/or "action" refer to logic that allows a user to perform a task or work. Each action serves a unique purpose and can have a corresponding user interface (UI) element (e.g., action button or link) that invokes that action. An action button is a user interface element or component that can be selected by a user when a user interacts with it (e.g., selects or otherwise activates it) to invoke, trigger or execute a specific action. Action buttons can be predefined and provided by the application provider, or edited or uniquely created by an administrator of a tenant (or customer organization).

There are different types or categories of actions. Some examples of the different types or categories of actions can include: object-specific actions (OSAs) that are explicitly tied to an object and are created in the context of the object (e.g., OSAs operate within the context of an object); global actions that enable users to create object records and operate with user context, but operate without object context; standard actions defined by the application provider; custom actions that are defined by the application provider and can be edited by the tenant to customize them or that can be defined by the tenant; default actions; mobile smart actions; custom actions that have functionality defined by a tenant to create unique actions that are specific to their business and that can be used to launch custom pages created by the tenant; and productivity actions defined by the application provider that can appear on a set of objects such as account, contact, event, lead, user, user profile, etc. For example, to illustrate one specific, non-limiting example of the difference between an OSA and a global action, an OSA can use a current object/record as context, for example, to create a contact that is tied to an account being viewed. By contrast, global actions are performed without such context (e.g., creating a contact which is not associated with anything, posting a question to a message board, etc.). Neither type necessarily needs to result in the creation or modification of a record, such as actions which navigate to a web page.

In one embodiment, the sets of clickstream data 212 can then be processed at an analytics engine 220 to extract usage patterns 222 that indicate how end users interact with different features of the application during usage of the application. The extracted usage patterns 222 indicate which features (e.g., fields, buttons, links, pages, etc.) the end users interact with, how often they interact with each feature and in what order they interact with those features. The extracted usage patterns 222 can include a ranking that indicates how frequently a particular usage pattern occurs relative to other usage patterns within a particular organization.

An artificial intelligence (AI) engine 230 can then generate, based on the extracted usage patterns, recommendations 232 for modifying the application to better customize or tailor the application for more streamlined use by the end users (e.g., simplicity, faster use, more efficient use, improved data accuracy, system hardening, increased system/application adoption, etc.) in view of the extracted usage patterns 222.

To generate recommendations 232 for modifying the application, the AI engine 230 can use any number of artificial intelligence technologies. Artificial intelligence is an area of computer science emphasizes the creation of intelligent machines that work and react like humans. Some of the activities computers with artificial intelligence are designed for include learning. Examples of artificial intelligence algorithms include, but are not limited to, key learning, actor critic methods, reinforce, deep deterministic policy gradient (DDPG), multi-agent deep deterministic policy gradient (MADDPG), etc. Machine learning refers to an artificial intelligence discipline geared toward the technological development of human knowledge. Machine learning facilitates a continuous advancement of computing through exposure to new scenarios, testing and adaptation, while employing pattern and trend detection for improved decisions and subsequent, though not identical, situations. Machine learning (ML) algorithms and statistical models can be used by computer systems to effectively perform a specific task without using explicit instructions, relying on patterns and inference instead. Machine learning algorithms build a mathematical model based on sample data, known as "training data," in order to make predictions or decisions without being explicitly programmed to perform the task.

For example, supervised learning algorithms build a mathematical model of a set of data that contains both the inputs and the desired outputs. The data is known as training data, and consists of a set of training examples. Each training example has one or more inputs and a desired output, also known as a supervisory signal. In the case of semi-supervised learning algorithms, some of the training examples are missing the desired output. In the mathematical model, each training example is represented by an array or vector, and the training data by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task.

To provide predictive recommendations based on data sets received from the cloud computing platform, many different types of machine learning algorithms or models can be used individually or in combination as an ensemble. Examples of machine learning algorithms or models that can be implemented at the machine learning model can include, but are not limited to: regression models such as linear regression, logistic regression, and K—means clustering; one or more decision tree models (e.g., a random forest model); one or more support vector machines; one or more artificial neural networks; one or more deep learning networks (e.g., at least one recurrent neural network); fuzzy logic based models; genetic programming models; Bayesian networks or other Bayesian techniques, probabilistic machine learning models; Gaussian processing models; Hidden Markov models; and heuristically derived combinations of any of the above, etc. The types of machine learning algorithms differ in their approach, the type of data they input and output, and the type of task or problem that they are intended to solve Reinforcement learning is an area of machine learning concerned with how software agents ought to take actions in an environment so as to maximize some notion of cumulative reward. In machine learning, the environment is typically represented as a Markov Decision Process (MDP). Many reinforcement learning algorithms use dynamic programming techniques. Reinforcement learning algorithms do not assume knowledge of an exact mathematical model of the MDP and are used when exact models are infeasible.

A Hidden Markov model (HMM) is a statistical Markov model in which the system being modeled is assumed to be a Markov process with unobserved (hidden) states. An HMM can be considered as the simplest dynamic Bayesian network. A Bayesian network, belief network or directed acyclic graphical model is a probabilistic graphical model that represents a set of random variables and their conditional independence with a directed acyclic graph (DAG). Bayesian networks that model sequences of variables are called dynamic Bayesian networks. Generalizations of Bayesian networks that can represent and solve decision problems under uncertainty are called influence diagrams.

Support vector machines (SVMs), also known as support vector networks, are a set of related supervised learning methods used for classification and regression. Given a set of training examples, each marked as belonging to one of two categories, an SVM training algorithm builds a model that predicts whether a new example falls into one category or the other. An SVM training algorithm is a non-probabilistic, binary, linear classifier. In addition to performing linear classification, SVMs can efficiently perform a non-linear classification using what is called the kernel trick, implicitly mapping their inputs into high-dimensional feature spaces.

Decision tree learning uses a decision tree as a predictive model to go from observations about an item (represented in the branches) to conclusions about the item's target value (represented in the leaves). Tree models where the target variable can take a discrete set of values are called classification trees; in these tree structures, leaves represent class labels and branches represent conjunctions of features that lead to those class labels. Decision trees where the target variable can take continuous values (typically real numbers) are called regression trees. In decision analysis, a decision tree can be used to visually and explicitly represent decisions and decision making.

In one embodiment, the AI engine 230 can use any number of predictive or probabilistic methodologies to generate recommendations 232 for modifying the application. Examples can include Bayesian networks are a very general tool that can be used for a large number of problems: reasoning (using the Bayesian inference algorithm), learning (using the expectation-maximization algorithm), planning (using decision networks) and perception (using dynamic Bayesian networks). Probabilistic algorithms can also be used for filtering, prediction, smoothing and finding explanations for streams of data, helping perception systems to analyze processes that occur over time (e.g., hidden Markov models or Kalman filters). Complicated graphs with diamonds or other "loops" (undirected cycles) can require a sophisticated method such as Markov chain Monte Carlo, which spreads an ensemble of random walkers throughout the Bayesian network and attempts to converge to an assessment of the conditional probabilities.

In one implementation, the AI engine 230 can use a stochastic model, such as a Markov chain, to generate recommendations 232 for modifying the application. A Markov chain is a particular stochastic model that describes a sequence of possible events in which the probability of each event depends only on the state attained in the previous event. A Markov chain is a type of Markov process that has either a discrete state space or a discrete index set (often representing time). For example, it is common to define a Markov chain as a Markov process in either discrete or continuous time with a countable state space (thus regardless of the nature of time), but it is also common to define a Markov chain as having discrete time in either countable or continuous state space (thus regardless of the state space). In this implementation, clickstreams provide the events which then the AI engine 230 can record and analyze. The AI engine 230 can provide continual recommendations based on the outcomes of those clickstream events. The AI engine 230 can continually learn based on how the instance's users interact across the platform. Based on the clickstream recipes, recommendation solutions can be provided that point to another feature on the platform that may be underutilized or overlooked entirely by developers. When data points collected meet certain requirements that align to specific features on the system that may not be currently utilized, recommendation solutions can be provided that points to another feature on the platform that may be underutilized or overlooked entirely by developers. The system development team knows of all the features that exist on the system, because they created the system. As such, application development is no longer reliant on the knowledge of the application developer who may not be familiar with the entirety of the system.

The recommendations 232 provided can vary depending on the implementation. For example, in one embodiment, the recommendations 232 provided can include suggested modifications to an existing process (in accordance with which the end users interact with the application) to result in a modified process (in accordance with which the end users interact with the application) to improve or simplify the end users interaction with the application (e.g., a new process to remove repetitive actions for end-users). In another embodiment, the recommendations 232 provided by the system alert can include suggested modifications to an existing process workflow (in accordance with which the end users interact with the application) to result in a modified process workflow (in accordance with which the end users interact with the application) to reduce a number of steps required to perform or complete a task, a job or an action when the end users interact with the application.

In another embodiment, the recommendations 232 provided can include a new process (in accordance with which the end users interact with the application) to improve or simplify the end users interaction with the application (e.g., a new process to remove repetitive actions for end-users). In another embodiment, the recommendations 232 provided can include suggestion(s) for a new process flow in accordance with which the end users interact with the application. In another embodiment, the recommendations 232 provided by the system alert can include a new process workflow (in accordance with which the end users interact with the application) to perform or complete a task, a job or an action when the end users interact with the application.

In another embodiment, the recommendations 232 can suggest modifications to any combination of features of the application including whether an existing feature should be modified or removed, and whether a new feature should be added. A few non-limiting examples of features of an application include user interface elements such as: input controls (e.g., buttons, text fields, checkboxes, radio buttons, dropdown lists, list boxes, toggles, date field); navigational components (e.g., breadcrumb, slider, search field, pagination, tags, icons); informational components (e.g., tooltips, icons, progress bar, notifications, message boxes, modal windows); containers (e.g., accordion); assets, etc. Features of an application will now be described in greater detail below.

As used herein some common definitions of user interface elements can include one or more of: a button (e.g., a control which can be clicked upon to perform an action. An equivalent to a push-button as found on mechanical or electronic instruments); a radio button (e.g., a control which can be clicked upon to select one option from a selection of options, similar to selecting a radio station from a group of buttons dedicated to radio tuning. Radio buttons always appear in pairs or larger groups, and only one option in the group can be selected at a time; selecting a new item from the group's buttons also de-selects the previously selected button); a check box (e.g., control which can be clicked upon to enable or disable an option. Also called a tick box. The box indicates an "on" or "off" state via a check mark/tick or a cross, and can also sometimes be shown in an intermediate state (shaded or with a dash) to indicate that various objects in a multiple selection have different values for the property represented by the check box. Multiple check boxes in a group may be selected, in contrast with radio buttons. A split button (e.g., control combining a button (typically invoking some default action) and a drop-down list with related, secondary actions). A cycle button—a button that cycles its content through two or more values, thus enabling selection of one from a group of items. A slider (e.g., control with a handle that can be moved up and down (vertical slider) or right and left (horizontal slider) on a bar to select a value (or a range if two handles are present). The bar allows users to make adjustments to a value or process throughout a range of allowed values. A list box (e.g., a graphical control element that allows the user to select one or more items from a list contained within a static, multiple line text box. A spinner (e.g., value input control which has small up and down buttons to step through a range of values). A drop-down list (e.g., a list of items from which to select. The list normally only displays items when a special button or indicator is clicked.) A menu (e.g., control with multiple actions which can be clicked upon to choose a selection to activate.

A context menu (e.g., a type of menu whose contents depend on the context or state in effect when the menu is invoked). A pie menu (e.g., a circular context menu where selection depends on direction). A menu bar (e.g., a graphical control element which contains drop down menus). A toolbar (e.g., a graphical control element on which on-screen buttons, icons, menus, or other input or output elements are placed). A ribbon (e.g., a hybrid of menu and toolbar, displaying a large collection of commands in a visual layout through a tabbed interface). A combo box or text box with attached menu or a list box (e.g., a combination of a single-line text box and a drop-down list or list box, allowing the user to either type a value directly into the control or choose from the list of existing options). An icon (e.g., a quickly comprehensible symbol of a software tool, function, or a data file). A tree view (e.g., a graphical control element that presents a hierarchical view of information. A grid view or datagrid (e.g., a spreadsheet-like tabular view of data that allows numbers or text to be entered in rows and columns.

As used herein some common definitions of navigational components can include one or more of: links (e.g., text with some kind of indicator (usually underlining and/or color) that indicates that clicking it will take one to another screen or page); tabs (e.g., a graphical control element that allows multiple documents or panels to be contained within a single window; scrollbars (e.g., a graphical control element by which continuous text, pictures, or any other content can be scrolled in a predetermined direction (up, down, left, or right); text/value inputs such as a text box (e.g., (edit field)—a graphical control element intended to enable the user to input text; combo box (e.g., a graphical control element combining a drop-down list or list box and a single-line editable textbox); outputs such as labels (e.g., text used to describe another widget); tooltips (e.g., informational window which appears when the mouse hovers over another control); balloon helpers; status bars (e.g., a graphical control element which poses an information area typically found at the window's bottom); progress bars (e.g., a graphical control element used to visualize the progression of an extended computer operation, such as a download, file transfer, or installation); infobars (e.g., a graphical control element used by many programs to display non-critical information to a user).

As used herein some common definitions of containers can include one or more of: windows (e.g., a graphical control element consisting of a visual area containing some of the graphical user interface elements of the program it belongs to); collapsible panels (e.g., a panel that can compactly store content which is hidden or revealed by clicking the tab of the widget). Accordions (e.g., a vertically stacked list of items, such as labels or thumbnails where each item can be "expanded" to reveal the associated content) modal windows (e.g., a graphical control element subordinate to an application's main window which creates a mode where the main window can't be used); dialog boxes (e.g., a small window that communicates information to the user and prompts for a response); palette windows (e.g., also known as "Utility window"—a graphical control element which floats on top of all regular windows and offers ready access tools, commands or information for the current application); inspector windows (e.g., a type of dialog window that shows a list of the current attributes of a selected object and allows these parameters to be changed on the fly); frames (e.g., a type of box within which a collection of graphical control elements can be grouped as a way to show relationships visually); canvases (e.g., generic drawing element for representing graphical information); cover flows (e.g., an animated, three-dimensional element to visually flipping through snapshots of documents, website bookmarks, album artwork, or photographs); bubble flows (e.g., an animated, two-dimensional element that allows users to browse and interact the entire tree view of a discussion thread.

As used herein, the term "asset" can refer to a resource or components that developers need in order to implement an artifact used in a UI and UX. A few non-limiting examples of UI design assets are color, palettes (codes), styles, icons, fonts, images, animation, audio, video and each and every other element that is used in visual design techniques.

Many of the features of an application that are described herein can be presented to end users via a Graphical User Interfaces (GUI) that is part of the application. Graphical user interfaces (GUIs) use visual conventions to represent the generic information shown. Some conventions are used to build the structure of the static elements on which the user can interact, and define the appearance of the interface can include windows (e.g., an area on the screen that displays information, with its contents being displayed independently from the rest of the screen). A window can be placed in front or behind another window, its size can be adjusted, and scrollbars can be used to navigate the sections within it. Multiple windows can also be open at one time, in which case each window can display a different application or file (e.g., this is very useful when working in a multitasking environment. The system memory is the only limitation to the number of windows that can be open at once. There are also many types of specialized windows.) A container window is a window that is opened while invoking the icon of a mass storage device, or directory or folder and which is presenting an ordered list of other icons that could be again some other directories, or data files or maybe even executable programs. All modern container windows could present their content on screen either acting as browser windows or text windows. Their behavior can automatically change according to the choices of the single users and their preferred approach to the graphical user interface. A browser window allows the user to move forward and backwards through a sequence of documents or web pages. Web browsers are an example of these types of windows. Text terminal windows are designed for embedding interaction with text user interfaces within the overall graphical interface. MS-DOS and UNIX consoles are examples of these types of windows. A child window opens automatically or as a result of a user activity in a parent window. Pop-up windows on the Internet can be child windows. A message window, or dialog box, is a type of child window. These are usually small and basic windows that are opened by a program to display information to the user and/or get information from the user. They usually have a button that must be pushed before the program can be resumed.

Menus allow the user to execute commands by selecting from a list of choices. Options are selected within a GUI using a mouse, a pointing device, a keyboard, etc. Menus are convenient because they show what commands are available within the software. This limits the amount of documentation the user reads to understand the software. A menu bar can be displayed horizontally across the top of the screen and/or along the tops of some or all windows. A pull-down menu can be commonly associated with this menu type. When a user clicks on a menu option the pull-down menu will appear. A menu has a visible title within the menu bar. Its contents are only revealed when the user selects it with a pointer. The user is then able to select the items within the pull-down menu. When the user clicks elsewhere the content of the menu will disappear. A context menu is invisible until the user performs a specific mouse action, like pressing the right mouse button. When the software-specific mouse action occurs the menu will appear under the cursor. Menu extras are individual items within or at the side of a menu.

An icon can refer to a small picture that represents objects such as a file, program, web page, or command. They are a quick way to execute commands, open documents, and run programs. Icons are also very useful when searching for an object in a browser list, because in many operating systems all documents using the same extension will have the same icon.

A graphical control, element or widget can refer to one or more software components that a computer user interacts with through direct manipulation to read or edit information about an application. Each widget facilitates a specific user-computer interaction. Structuring a user interface with widget toolkits allow developers to reuse code for similar tasks, and provides users with a common language for interaction, maintaining consistency throughout the whole information system. Common uses for widgets involve the display of collections of related items (e.g., with various list and canvas controls), initiation of actions and processes within the interface (e.g., buttons and menus), navigation within the space of the information system (e.g., links, tabs and scrollbars), and representing and manipulating data values (e.g., labels, check boxes, radio buttons, sliders, spinners . . . etc.).

A tab can refer to a rectangular small box which usually contains a text label or graphical icon associated with a view pane. When activated the view pane, or window, displays widgets associated with that tab; groups of tabs allow the user to switch quickly between different widgets. Multiple web pages can be open at once in one window, and allow an end user to quickly navigate between them by clicking on the tabs associated with the pages. Tabs are usually placed in groups at the top of a window, but may also be grouped on the side or bottom of a window. Tabs are also present in the settings panes of many applications. Windows for example uses tabs in most of its control panel dialogues.

Interaction elements for interaction have evolved in the visual language used in GUIs. Interaction elements can be interface objects that represent the state of an ongoing operation or transformation, either as visual remainders of the user intent (such as the pointer), or as affordances showing places where the user may interact. A cursor is an indicator used to show the position on a computer monitor or other display device that will respond to input from a text input or pointing device. A pointer echoes movements of a pointing device (e.g., a mouse or touchpad). The pointer is the place where actions take place that are initiated through direct manipulation gestures such as click, touch and drag. An insertion point, caret, text cursor or other represents a point of the user interface where the focus is located. It represents the object that will be used as the default subject of user-initiated commands such as writing text, starting a selection or a copy-paste operation through the keyboard. A selection is a list of items on which user operations will take place. The user typically adds items to the list manually, although the computer may create a selection automatically. An adjustment handle is an indicator of a starting point for a drag and drop operation. Usually the pointer shape changes when placed on the handle, showing an icon that represents the supported drag operation.

Referring again to FIG. 2, the recommendations 232 can suggest, for example, modifications to features of the application such as whether an input control of the application should be presented within the application, or an order in which that input control of the application is presented to an end user of the application. The recommendations 232 can also suggest, for example, modifications to features of the application such as whether a navigational component of the application is presented within the application, or an order in which that navigational component of the application is presented to an end user of the application. The recommendations 232 can also suggest, for example, modifications to features of the application such as whether an informational component of the application is presented within the application, or an order in which that informational component of the application is presented to an end user of the application. The recommendations 232 can also suggest, for example, modifications to features of the application such as whether a container of the application is presented within the application, or an order in which that container of the application is presented to an end user of the application. A container can be, for instance, an accordion, which is a vertically stacked list of items that utilizes show/hide functionality. When a label is clicked, it expands the section showing the content within. There can have one or more items showing at a time and may have default states that reveal one or more sections without the user clicking. The recommendations 232 can also suggest, for example, modifications to features of the application such as whether a page of the application is presented within the application, or an order in which that page of the application is presented to an end user of the application. A page can refer to a particular instance that is displayed via a GUI on a display screen of a computer display. Types of pages can include account pages, case pages, contact pages, custom pages, event pages, feed pages, group pages, lead pages, list view pages, opportunity pages, people pages, person account pages, related list pages, search results pages, task pages, etc. Each page can include various action buttons.

In one embodiment, the AI engine 230 can automatically select one or more of the recommendations 232 and implement the best recommendations 232 (e.g., select the best recommended approach). In another embodiment, the recommendations 232 can be used by a developer (or administrator) to help guide their decisions. For example, a user (e.g., developer, administrator, designer, etc.) can be presented with the option of accepting recommendations for one or more new/modified features or processes of the application to improve or simplify the application. When the user accepts any of the recommendations, the suggested modification that corresponds to that recommendation (that was accepted) can be implemented to create a new or modified version of application based on the accepted recommendation. For instance, in one implementation, a designer or developer, who is using a design tool, can utilize the design tool to interact with components of a design system to modify the application including, for example modifying the flow of the application to re-define the structure of that application, and/or modifying features of a user interface of the application that are described above.

FIGS. 3-7B are flowcharts of methods 300, 400, 500, 600, 700 for providing recommendations to modify an application provided by a cloud-based computing system in accordance with the disclosed embodiments. It should be understood that steps of the methods 300, 400, 500, 600, 700 are not necessarily limiting, and that steps can be added, omitted, and/or performed simultaneously without departing from the scope of the appended claims. It should be appreciated that the methods 300, 400, 500, 600, 700 may include any number of additional or alternative tasks, that the tasks shown in FIGS. 3-7B need not be performed in the illustrated order, and that the methods 300, 400, 500, 600, 700 may be incorporated into a more comprehensive procedure or process having additional functionality not described in detail herein. Moreover, one or more of the tasks shown in FIGS. 3-7B could potentially be omitted from an embodiment of the methods 300, 400, 500, 600, 700 as long as the intended overall functionality remains intact. It should also be understood that the illustrated methods 300, 400, 500, 600, 700 are computer-implemented in that various tasks or steps that are performed in connection with the methods 300, 400, 500, 600, 700 may be performed by software, hardware, firmware, or any combination thereof. For illustrative purposes, the following description of the methods 300, 400, 500, 600, 700 may refer to elements mentioned above in connection with FIGS. 1 and 2. In certain embodiments, some or all steps of this process, and/or substantially equivalent steps, are performed by execution of processor-readable instructions stored or included on a processor-readable medium. For instance, in the description of FIGS. 3-7B that follows, elements of FIGS. 1 and 2 can be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of systems that work together.

Figure 3:
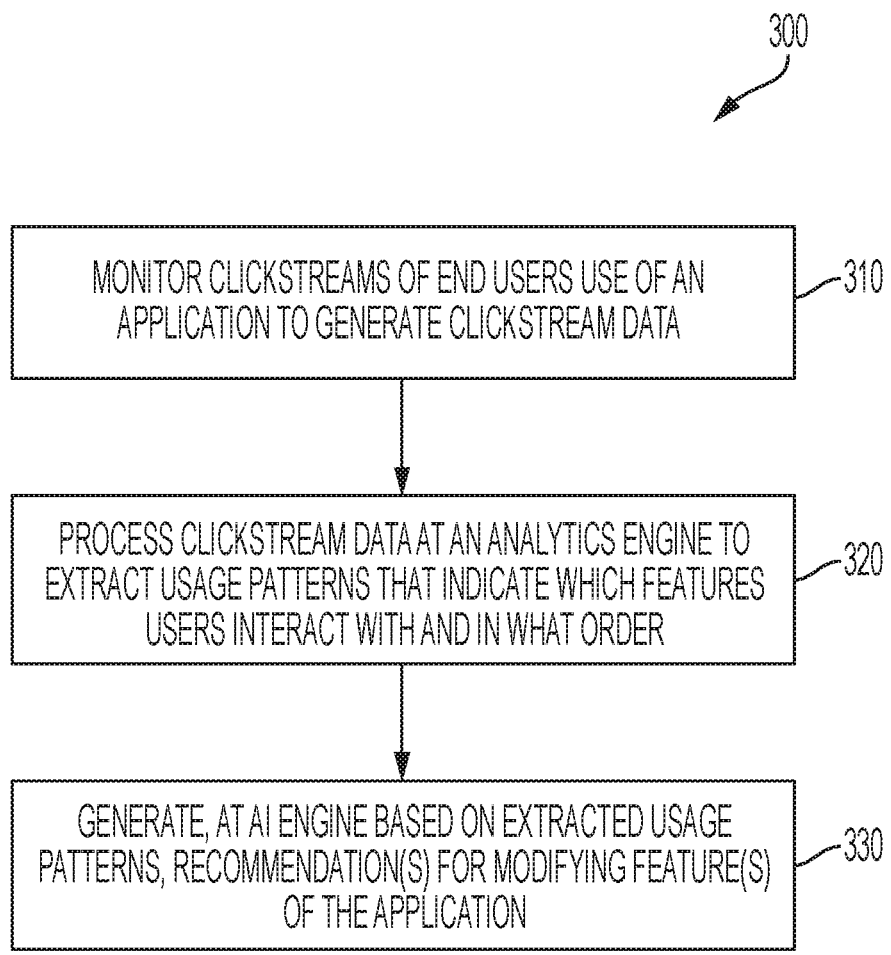
FIG. 3 is a flowchart of a method for providing recommendations to modify an application provided by a cloud-based computing system in accordance with the disclosed embodiments.

FIG. 3 is a flowchart of a method 300 for providing recommendations to modify an application provided by a cloud-based computing system in accordance with the disclosed embodiments. The application can be used by end users of organizations that are part of the cloud-based computing system. The method 300 will be described below with continued reference to FIGS. 1 and 2.

At 310, a clickstream monitoring module 210 monitors clickstreams 202-1 . . . 202-N generated by each end user as that end user interacts with an application to generate a set of clickstream data 212 for each particular end user. As noted above, a clickstream can be a record that contains data about an end user's clicks on a computer display screen (e.g., via a mouse or touchpad). This data can provide a trail of an end user's real-time interaction or activity with an application. Stated differently, a clickstream can represent a path an end user takes when interacting with an application (e.g., a set or series of actions taken by an end user when interacting with the application). For example, this can include tracking data about which application features (e.g., fields, buttons, links, pages, etc.) an end user interacts with, how often they interact with each feature and in what order they interact with each feature. The sets of clickstream data 212 collectively indicate one or more paths of action or interaction with features of the application by each particular end user while they interact with the application.

At 320, the sets of clickstream data 212 can then be processed at an analytics engine 220 to extract usage patterns 222 that indicate how end users interact with different features of the application during usage of the application.

The extracted usage patterns 222 indicate which features (e.g., fields, buttons, links, pages, etc.) of an application that the end users interact with, how often they interact with each feature and in what order they interact with each feature. An artificial intelligence engine 230 can then generate, based on the extracted usage patterns, recommendations 232 for modifying one or more features of the application to better customize or tailor the application for use by the end users in view of the extracted usage patterns 222.

At 330, the AI engine 230 can generate, based on the extracted usage patterns, recommendations 232 that suggest modifications to the application. In one embodiment, the recommendations 232 can suggest, for example, modifications to features of the application. In one embodiment, the AI engine 230 can automatically select one or more of the recommendations and implement the best recommendations (e.g., select the best recommended approach) and automatically modify the application accordingly. In another embodiment, these recommendations can be used by a developer (or administrator) to help guide their decisions. The features that can be recommended for modification can vary depending on the implementation. FIGS. 4-7B are flowcharts of methods 400, 500, 600, 700 for providing recommendations to modify an application provided by a cloud-based computing system in accordance with the disclosed embodiments. Steps 410, 510, 610, 710 are the same as step 310, and steps 420, 520, 620, 720 are the same as step 320, and therefore the description of those steps will not be repeated for sake of brevity.

Figure 4:
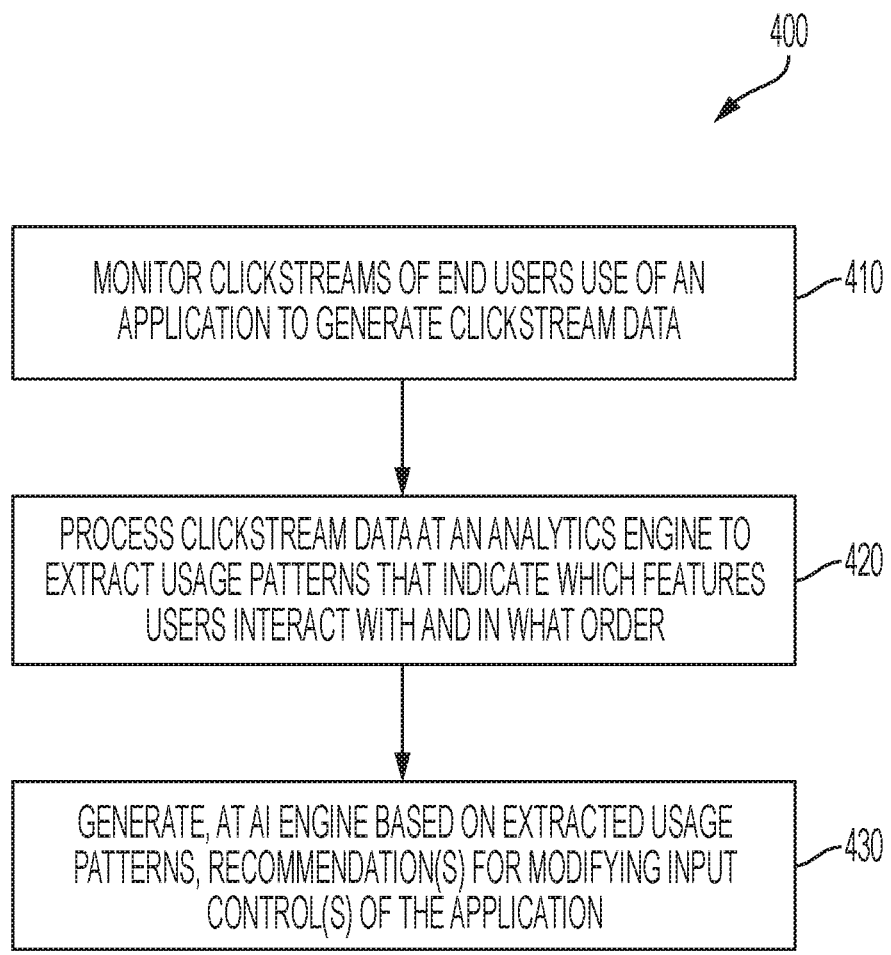
FIG. 4 is a flowchart of a method for providing recommendations to modify an application provided by a cloud-based computing system in accordance with the disclosed embodiments.

FIG. 4 is a flowchart of a method 400 for providing recommendations to modify an application provided by a cloud-based computing system in accordance with the disclosed embodiments. The method 400 will be described below with continued reference to FIGS. 1 and 2. At 430, the AI engine 230 can generate, based on the extracted usage patterns, recommendations 232 that suggest modifications to features of the application such as whether an input control of the application should be presented within the application, or an order in which that input control of the application is presented to an end user of the application. In one embodiment, the AI engine 230 can automatically select one or more of the recommendations and implement the best recommendations (e.g., select the best recommended approach) and automatically modify the application accordingly. In another embodiment, these recommendations can be used by a developer (or administrator) to help guide their decisions.

Figure 5:
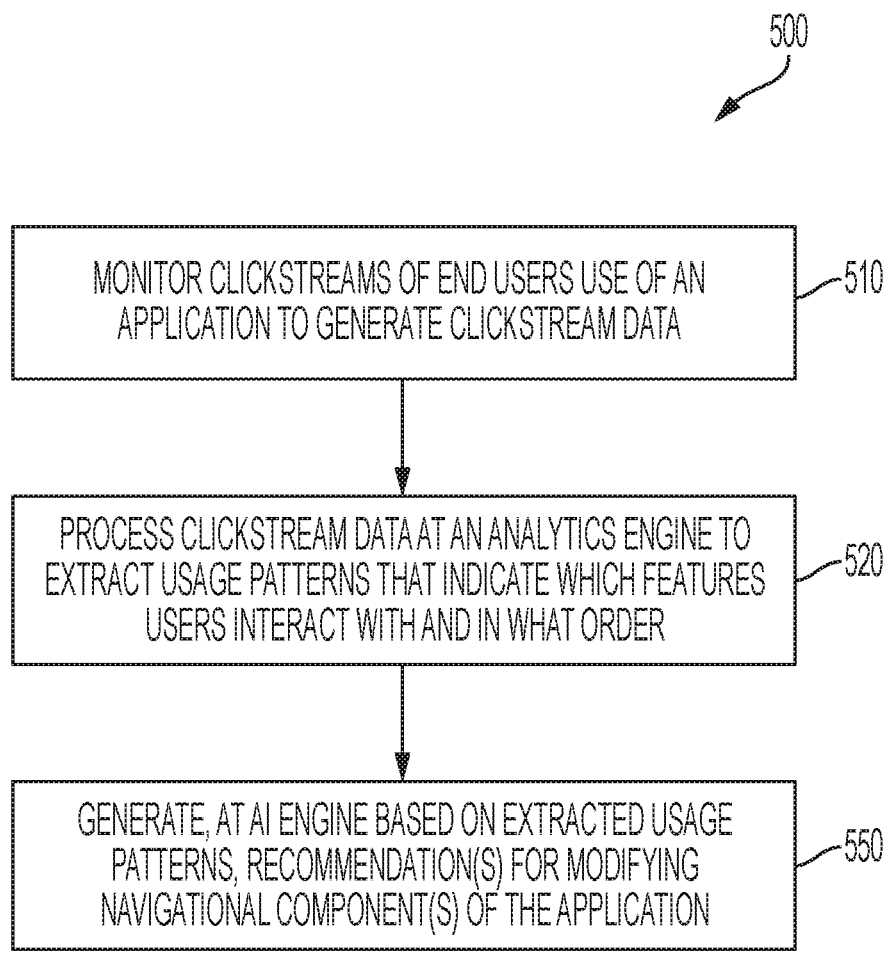
FIG. 5 is a flowchart of a method for providing recommendations to modify an application provided by a cloud-based computing system in accordance with the disclosed embodiments.

FIG. 5 is a flowchart of a method 500 for providing recommendations to modify an application provided by a cloud-based computing system in accordance with the disclosed embodiments. The method 500 will be described below with continued reference to FIGS. 1 and 2. At 530, the AI engine 230 can generate, based on the extracted usage patterns, recommendations 232 that suggest modifications such as whether a navigational component of the application is presented within the application, or an order in which that navigational component of the application is presented to an end user of the application. In one embodiment, the AI engine 230 can automatically select one or more of the recommendations and implement the best recommendations (e.g., select the best recommended approach) and automatically modify the application accordingly. In another embodiment, these recommendations can be used by a developer (or administrator) to help guide their decisions.

Figure 6:
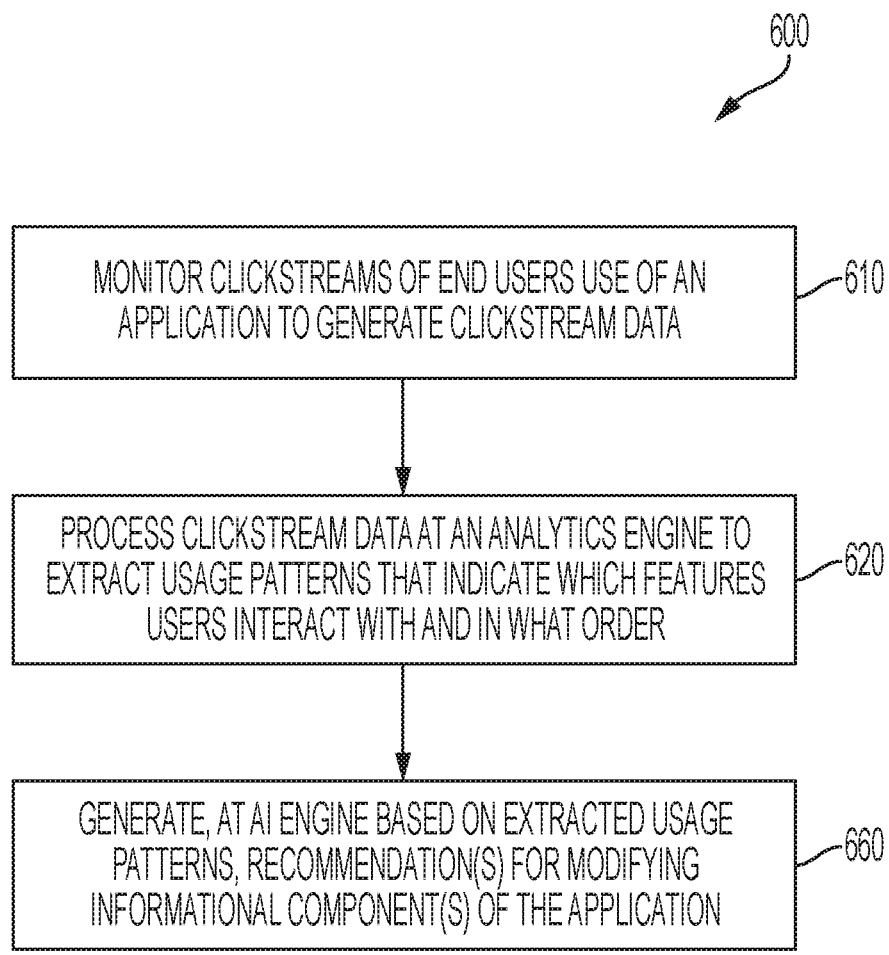
FIG. 6 is a flowchart of a method for providing recommendations to modify an application provided by a cloud-based computing system in accordance with the disclosed embodiments.

FIG. 6 is a flowchart of a method 600 for providing recommendations to modify an application provided by a cloud-based computing system in accordance with the disclosed embodiments. The method 600 will be described below with continued reference to FIGS. 1 and 2. At 630, the AI engine 230 can generate, based on the extracted usage patterns, recommendations 232 that suggest modifications to features of the application such as whether an informational component of the application is presented within the application, or an order in which that informational component of the application is presented to an end user of the application. In one embodiment, the AI engine 230 can automatically select one or more of the recommendations and implement the best recommendations (e.g., select the best recommended approach) and automatically modify the application accordingly. In another embodiment, these recommendations can be used by a developer (or administrator) to help guide their decisions.

Although not illustrated in FIGS. 3-6, the AI engine 230 can also generate, based on the extracted usage patterns, recommendations 232 that suggest modifications to other features of the application, such as, whether a container of the application is presented within the application, or an order in which that container of the application is presented to an end user of the application; whether a page of the application is presented within the application, or an order in which that page of the application is presented to an end user of the application, etc. The recommendations 232 can suggest modifications to any combination of features described herein.

Figure 7A:
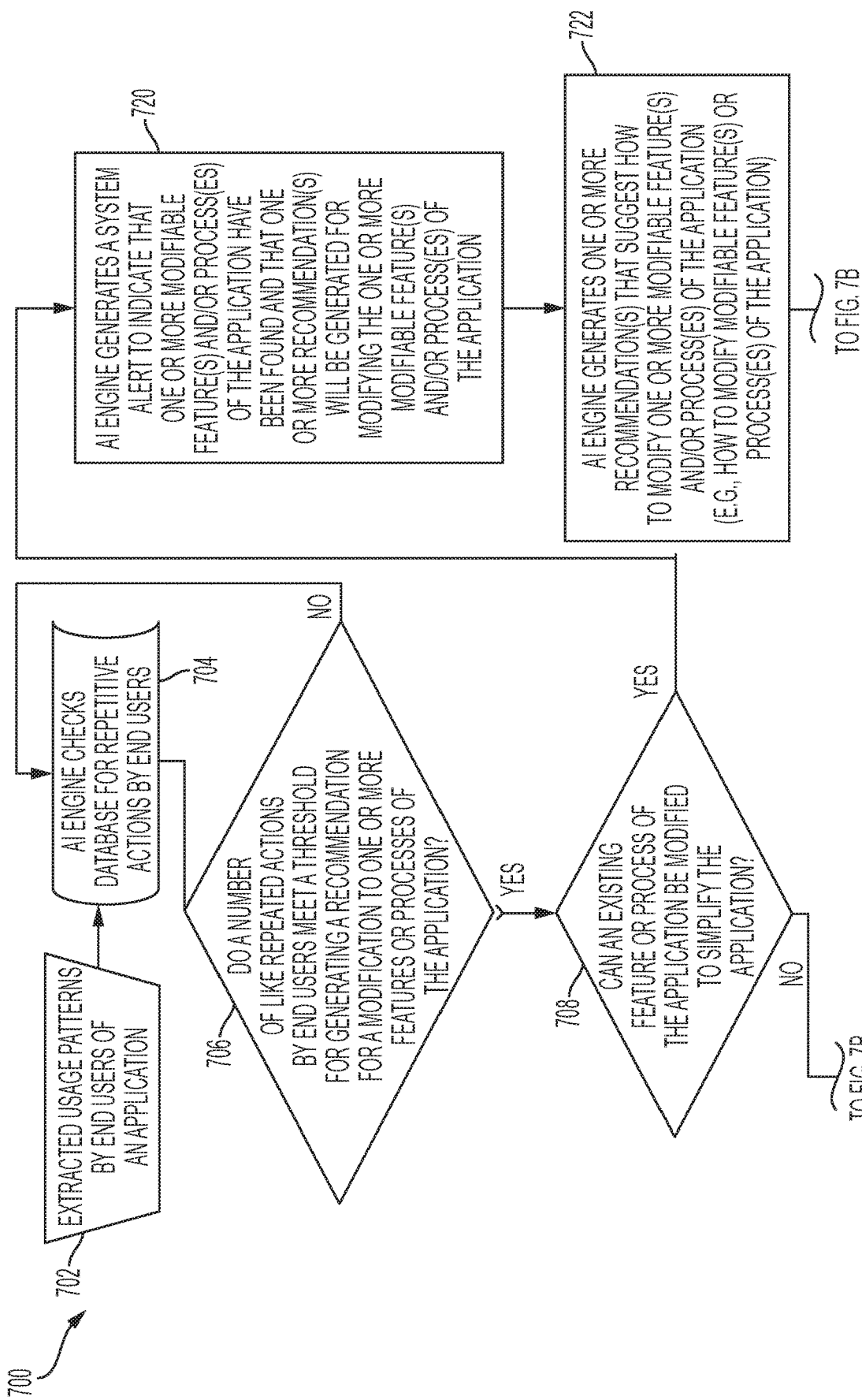
FIGS. 7A-7B are collectively a flowchart of a method for providing recommendations to modify an application provided by a cloud-based computing system in accordance with the disclosed embodiments.
Figure 7B:
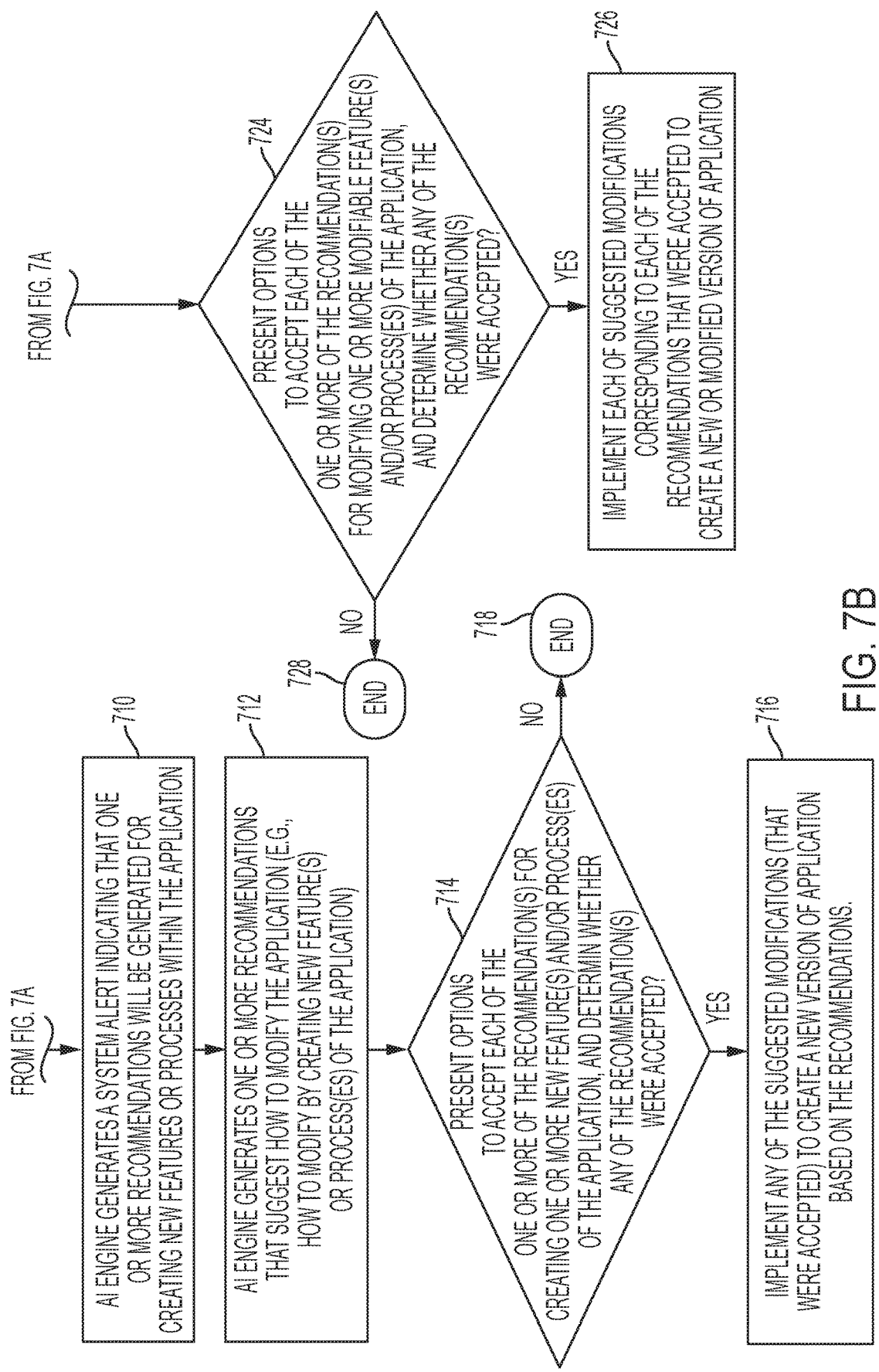

FIGS. 7A-7B are collectively a flowchart of a method 700 for providing recommendations to modify an application provided by a cloud-based computing system in accordance with the disclosed embodiments. The method 700 will be described below with continued reference to FIGS. 1 and 2.

Storage 702 maintains a database of extracted usage patterns for an application. The extracted usage patterns can include, for example, repeated actions by end users that are performed on existing records/objects. At 704, the AI engine 230 continuously checks the database for repetitive actions by end users (e.g., as evidenced by end user's interactions with a metadata layer, for instance, creating custom tables, fields, flows, processes, etc. that will work in conjunction with their data, such as, actions that are performed on existing records/objects in one implementation). At 706, the AI engine 230 determines whether a number of like repeated actions by end users meet a threshold for generating a recommendation for a modification to one or more features of the application or one or more processes of the application. When the AI engine 230 determines (at 706) that the number of like repeated actions by end users does not meet a threshold for generating a recommendation (for a modification to one or more features or processes of the application), the method 700 loops back to 704, where the AI engine 230 continues to check the database for repetitive actions by end users (e.g., in one implementation, actions that are performed on existing records/objects).

When the AI engine 230 determines (at 706) that a number of like repeated actions by end users meets a threshold for generating a recommendation for a modification to one or more features or one or more processes of the application, the method 700 proceeds to 708, where the AI engine 230 determines whether an existing feature or process of the application can be modified to improve the application (e.g., simplify the application to remedy an existing repetitive process).

When the AI engine 230 determines (at 708) that an existing feature or process of the application cannot be modified to simplify the application, the method 700 proceeds to 710, where the AI engine 230 generates a system alert indicating that one or more recommendations will be generated for creating new features or processes within the application. The method 700 then proceeds to 712, where the AI engine 230 generates one or more recommendations that suggest how to modify the application (e.g., how to modify by creating new feature(s) or process(es) of the application).

The recommendation(s) provided can vary depending on the implementation. For example, in one embodiment, the recommendations provided can include a new process (in accordance with which the end users interact with the application) to improve or simplify the end users interaction with the application (e.g., a new process to remove repetitive actions for end-users). In another embodiment, the recommendations provided can include suggestion(s) for a new process flow in accordance with which the end users interact with the application. In another embodiment, the recommendations provided by the system alert can include a new process workflow (in accordance with which the end users interact with the application) to perform or complete a task, a job or an action when the end users interact with the application.

In another embodiment, the recommendations provided can include suggestions for new feature(s) of the application (e.g., recommendation(s) that suggest one or more input controls for the application and/or an order in which input controls(s) are presented to the end users of the application; recommendation(s) that suggest one or more navigational component(s) for the application and/or an order in which navigational component(s) are presented to the end users of the application; recommendation(s) that suggest one or more informational component(s) for the application and/or an order in which informational component(s) are presented to the end users of the application; recommendation(s) that suggest one or more container(s) for the application and/or an order in which container(s) are presented to the end users of the application; recommendation(s) that suggest one or more page(s) for the application and/or an order in which page(s) are presented to the end users of the application; recommendation(s) that suggest one or more field(s) for the application and/or an order in which field(s) of the application are presented to the end users of the application, etc.) In another embodiment, the recommendations can include any combination of the above.

Although not illustrated in FIGS. 7A-7B, in one embodiment, the AI engine 230 can automatically select one or more of the recommendations and implement the best recommendations (e.g., select the best recommended approach).

In another embodiment, these recommendations can be used by a developer (or administrator) to help guide their decisions. In this embodiment, the method 700 then proceeds to 714, where a user is presented with the option of accepting each or the one or more recommendations (e.g., for creating one or more new features and/or processes of the application) to improve or simplify the application. At 714, it is also determined whether any of the recommendation(s) were accepted. When the user accepts the recommendations at 714, the method 700 proceeds to 716, where the suggested modifications (that were accepted) are implemented to create a new version of application based on the recommendations. By contrast, when the user does not accept the recommendations at 714, the method 700 proceeds 718 where the method 700 ends.

When the AI engine 230 determines (at 708) that one or more existing features and/or processes of the application can be modified to improve or simplify the application (e.g., edit a process to factor in repetitive actions and reduce the number of steps user must take in order to complete a task, etc.), the method 700 proceeds to 720, where the AI engine 230 generates a system alert to indicate that one or more modifiable feature(s) and/or process(es) have been found and that one or more recommendations will be generated for modifying the one or more modifiable feature(s) and/or process(es) of the application.

The method 700 then proceeds to 722, where the AI engine 230 generates one or more recommendations that suggest how to modify one or more modifiable feature(s) and/or process(es) of the application. The recommendation(s) provided can vary depending on the implementation.

For example, in one embodiment, the recommendations provided can include suggested modifications to an existing process (in accordance with which the end users interact with the application) to result in a modified process (in accordance with which the end users interact with the application) to improve or simplify the end users interaction with the application (e.g., a new process to remove repetitive actions for end-users). In another embodiment, the recommendations provided by the system alert can include suggested modifications to an existing process workflow (in accordance with which the end users interact with the application) to result in a modified process workflow (in accordance with which the end users interact with the application) to reduce a number of steps required to perform or complete a task, a job or an action when the end users interact with the application.

In another embodiment, the recommendations provided can include suggestions for modifications to feature(s) of the application. For example, the suggestions for modifications to feature(s) of the application can includes suggestions for modifications can include recommendation(s) that suggest whether one or more input controls of the application are presented within the application, or an order in which input control(s) of the application are presented to the end users of the application; recommendation(s) that suggest whether one or more navigational component(s) of the application are presented within the application, or an order in which navigational component(s) of the application are presented to the end users of the application; recommendation(s) that suggest whether one or more informational component(s) of the application are presented within the application, or an order in which informational component(s) of the application are presented to the end users of the application; recommendation feature(s) that suggest whether one or more container(s) of the application are presented within the application, or an order in which container(s) of the application are presented to the end users of the application; recommendation(s) that suggest whether one or more page(s) of the application are presented within the application, or an order in which page(s) of the application are presented to the end users of the application; recommendation(s) that suggest whether one or more field(s) of the application are presented within the application, or an order in which field(s) of the application are presented to the end users of the application, etc. In another embodiment, the recommendations can include any combination of the above.

In one embodiment, the AI engine can automatically select one or more of the recommendations for modifying the application and implement the suggested changes to the application (e.g., select the best recommended approach on how to modify the application).

In another embodiment, these recommendations for modifying the application can be used by a developer (or administrator) to help guide their decisions when making changes to the application. In this embodiment, the method 700 then proceeds to 724, where the user is presented with options to accept one or more of the recommendations for modifying one or more modifiable features and/or processes of the application to improve or simplify the application. At 724, it is also determined whether any of the recommendation(s) were accepted. When the user accepts one or more of the recommendations at 724, the method 700 proceeds to 726, where each of the suggested modifications (corresponding to each of the recommendations that were accepted) are implemented to create a new or modified version of application based on the recommendations for modifying one or more features and/or processes of the application (e.g., existing features or processes of the application are modified based on the recommendations that were accepted). By contrast, when the user does not accept the recommendations (at 724), the method 700 proceeds to 728 where the method 700 ends.

The following description is of one example of a system in which the features described above may be implemented. The components of the system described below are merely one example and should not be construed as limiting. The features described above with respect to FIGS. 1-7B may be implemented in any other type of computing environment, such as one with multiple servers, one with a single server, a multi-tenant server environment, a single-tenant server environment, or some combination of the above.

Figure 8:
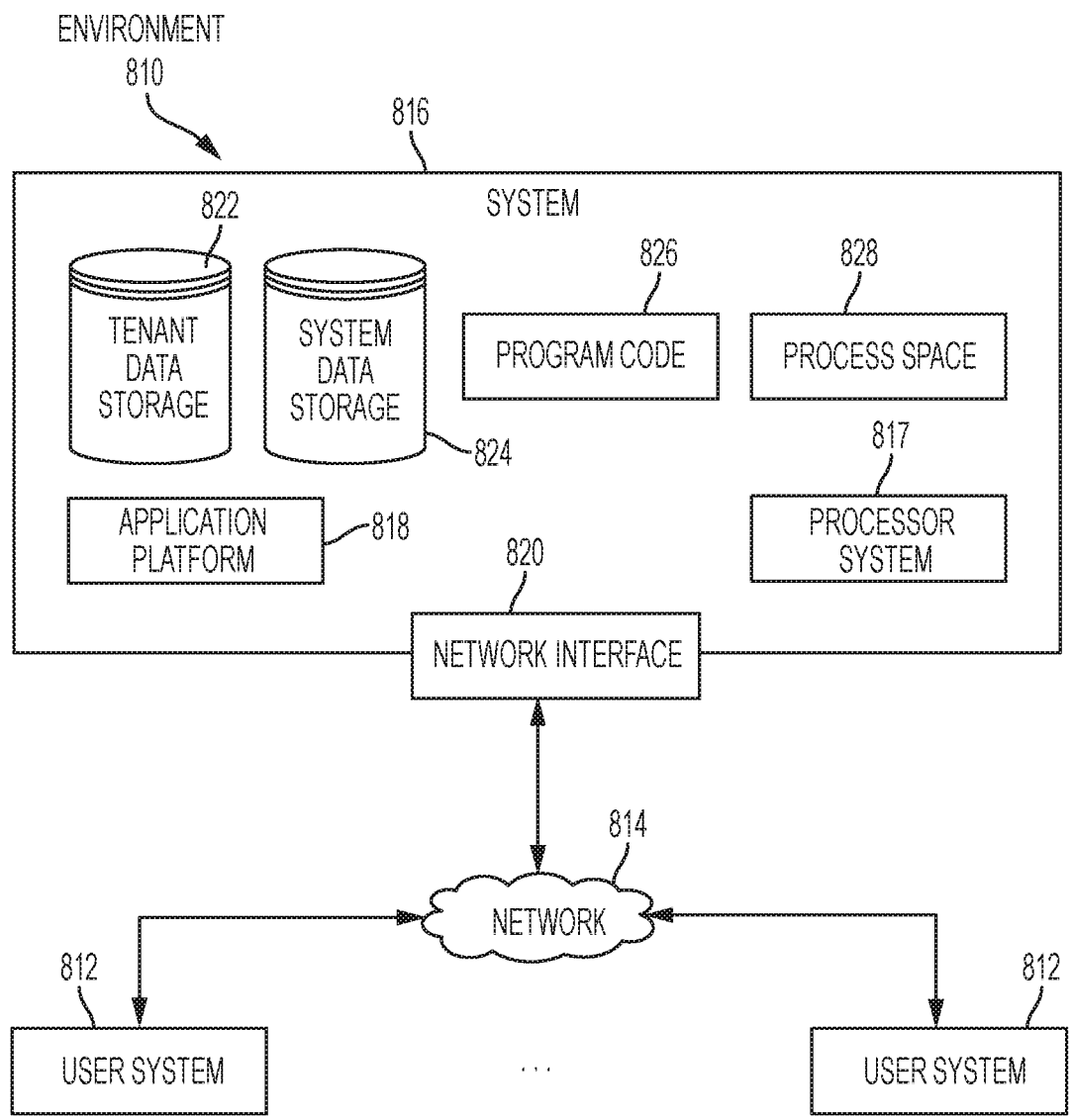
FIG. 8 shows a block diagram of an example of an environment in which an on-demand database service can be used in accordance with some implementations.

FIG. 8 shows a block diagram of an example of an environment 810 in which an on-demand database service can be used in accordance with some implementations. The environment 810 includes user systems 812, a network 814, a database system 816 (also referred to herein as a "cloud-based system"), a processor system 817, an application platform 818, a network interface 820, tenant database 822 for storing tenant data 823, system database 824 for storing system data 825, program code 826 for implementing various functions of the system 816, and process space 828 for executing database system processes and tenant-specific processes, such as running applications as part of an application hosting service. In some other implementations, environment 810 may not have all of these components or systems, or may have other components or systems instead of, or in addition to, those listed above.

In some implementations, the environment 810 is an environment in which an on-demand database service exists. An on-demand database service, such as that which can be implemented using the system 816, is a service that is made available to users outside of the enterprise(s) that own, maintain or provide access to the system 816. As described above, such users generally do not need to be concerned with building or maintaining the system 816. Instead, resources provided by the system 816 may be available for such users' use when the users need services provided by the system 816; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 818 can be a framework that allows the applications of system 816 to execute, such as the hardware or software infrastructure of the system 816. In some implementations, the application platform 818 enables the creation, management and execution of one or more applications developed by the provider of the on-demand database service, users accessing the on-demand database service via user systems 812, or third party application developers accessing the on-demand database service via user systems 812.

In some implementations, the system 816 implements a web-based customer relationship management (CRM) system. For example, in some such implementations, the system 816 includes application servers configured to implement and execute CRM software applications as well as provide related data, code, forms, renderable web pages and documents and other information to and from user systems 812 and to store to, and retrieve from, a database system related data, objects, and Web page content. In some MTS implementations, data for multiple tenants may be stored in the same physical database object in tenant database 822. In some such implementations, tenant data is arranged in the storage medium(s) of tenant database 822 so that data of one tenant is kept logically separate from that of other tenants so that one tenant does not have access to another tenant's data, unless such data is expressly shared. The system 816 also implements applications other than, or in addition to, a CRM application. For example, the system 816 can provide tenant access to multiple hosted (standard and custom) applications, including a CRM application. User (or third party developer) applications, which may or may not include CRM, may be supported by the application platform 818. The application platform 818 manages the creation and storage of the applications into one or more database objects and the execution of the applications in one or more virtual machines in the process space of the system 816.

According to some implementations, each system 816 is configured to provide web pages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 814 can be or include any network or combination of networks of systems or devices that communicate with one another. For example, the network 814 can be or include any one or any combination of a LAN (local area network), WAN (wide area network), telephone network, wireless network, cellular network, point-to-point network, star network, token ring network, hub network, or other appropriate configuration. The network 814 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 812 can communicate with system 816 using TCP/IP and, at a higher network level, other common Internet protocols to communicate, such as HTTP, FTP, AFS, WAP, etc. In an example where HTTP is used, each user system 812 can include an HTTP client commonly referred to as a "web browser" or simply a "browser" for sending and receiving HTTP signals to and from an HTTP server of the system 816. Such an HTTP server can be implemented as the sole network interface 820 between the system 816 and the network 814, but other techniques can be used in addition to or instead of these techniques. In some implementations, the network interface 820 between the system 816 and the network 814 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 812 can be implemented as any computing device(s) or other data processing apparatus or systems usable by users to access the database system 816. For example, any of user systems 812 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 812 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 816) of the user system 812 to access, process and view information, pages and applications available to it from the system 816 over the network 814.

Each user system 812 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 812 in conjunction with pages, forms, applications and other information provided by the system 816 or other systems or servers. For example, the user interface device can be used to access data and applications hosted by system 816, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 812 may differ in their respective capacities, and the capacity of a particular user system 812 can be entirely determined by permissions (permission levels) for the current user of such user system. For example, where a salesperson is using a particular user system 812 to interact with the system 816, that user system can have the capacities allotted to the salesperson. However, while an administrator is using that user system 812 to interact with the system 816, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 812 and some or all of its components are operator-configurable using applications, such as a browser, including computer code executed using a central processing unit (CPU) such as an Intel Pentium® processor or the like. Similarly, the system 816 (and additional instances of an MTS, where more than one is present) and all of its components can be operator-configurable using application(s) including computer code to run using the processor system 817, which may be implemented to include a CPU, which may include an Intel Pentium® processor or the like, or multiple CPUs.

The system 816 includes tangible computer-readable media having non-transitory instructions stored thereon/in that are executable by or used to program a server or other computing system (or collection of such servers or computing systems) to perform some of the implementation of processes described herein. For example, computer program code 826 can implement instructions for operating and configuring the system 816 to intercommunicate and to process web pages, applications and other data and media content as described herein. In some implementations, the computer code 826 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 9:
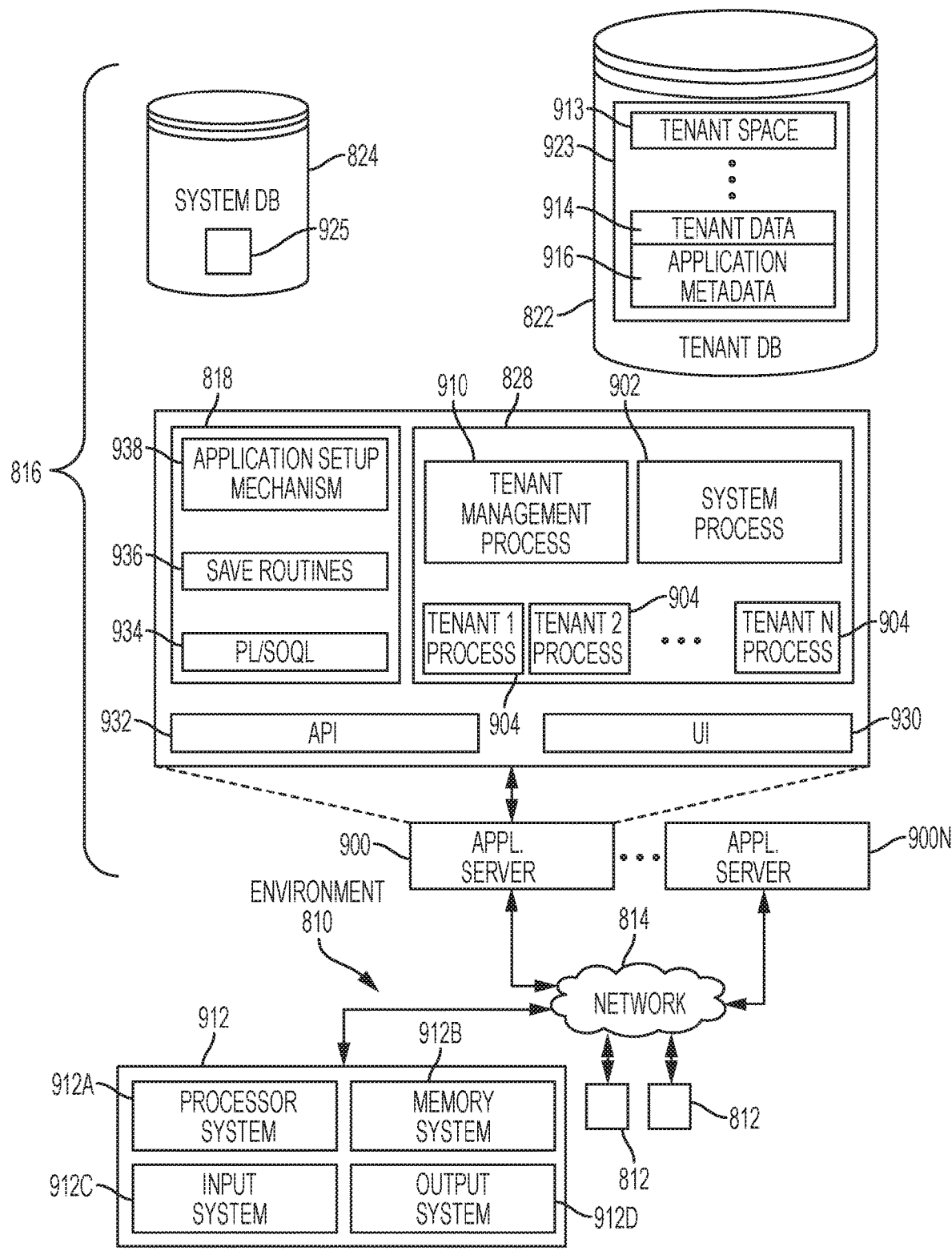
FIG. 9 shows a block diagram of example implementations of elements of FIG. 8 and example interconnections between these elements according to some implementations.

FIG. 9 shows a block diagram of example implementations of elements of FIG. 8 and example interconnections between these elements according to some implementations. That is, FIG. 9 also illustrates environment 810, but FIG. 9, various elements of the system 816 and various interconnections between such elements are shown with more specificity according to some more specific implementations. Elements from FIG. 8 that are also shown in FIG. 9 will use the same reference numbers in FIG. 9 as were used in FIG. 8. Additionally, in FIG. 9, the user system 812 includes a processor system 912A, a memory system 912B, an input system 912C, and an output system 912D. The processor system 912A can include any suitable combination of one or more processors. The memory system 912B can include any suitable combination of one or more memory devices. The input system 912C can include any suitable combination of input devices, such as one or more touchscreen interfaces, keyboards, mice, trackballs, scanners, cameras, or interfaces to networks. The output system 912D can include any suitable combination of output devices, such as one or more display devices, printers, or interfaces to networks.

In FIG. 9, the network interface 820 of FIG. 8 is implemented as a set of HTTP application servers 9001-1400N. Each application server 900, also referred to herein as an "app server," is configured to communicate with tenant database 822 and the tenant data 923 therein, as well as system database 824 and the system data 925 therein, to serve requests received from the user systems 912. The tenant data 923 can be divided into individual tenant storage spaces 913, which can be physically or logically arranged or divided. Within each tenant storage space 913, tenant data 914 and application metadata 916 can similarly be allocated for each user. For example, a copy of a user's most recently used (MRU) items can be stored to user storage 914. Similarly, a copy of MRU items for an entire organization that is a tenant can be stored to tenant storage space 913.

The process space 828 includes system process space 902, individual tenant process spaces 904 and a tenant management process space 910. The application platform 818 includes an application setup mechanism 938 that supports application developers' creation and management of applications. Such applications and others can be saved as metadata into tenant database 822 by save routines 936 for execution by subscribers as one or more tenant process spaces 904 managed by tenant management process 910, for example. Invocations to such applications can be coded using PL/SOQL 934, which provides a programming language style interface extension to API 932. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 816 of FIG. 9 also includes a user interface (UI) 930 and an application programming interface (API) 932 to system 816 resident processes to users or developers at user systems 912. In some other implementations, the environment 810 may not have the same elements as those listed above or may have other elements instead of, or in addition to, those listed above.

Each application server 900 can be communicably coupled with tenant database 822 and system database 824, for example, having access to tenant data 923 and system data 925, respectively, via a different network connection. For example, one application server 9001 can be coupled via the network 814 (for example, the Internet), another application server 900N can be coupled via a direct network link, and another application server (not illustrated) can be coupled by yet a different network connection. Transfer Control Protocol and Internet Protocol (TCP/IP) are examples of typical protocols that can be used for communicating between application servers 900 and the system 816. However, it will be apparent to one skilled in the art that other transport protocols can be used to optimize the system 816 depending on the network interconnections used.

In some implementations, each application server 900 is configured to handle requests for any user associated with any organization that is a tenant of the system 816. Because it can be desirable to be able to add and remove application servers 900 from the server pool at any time and for various reasons, in some implementations there is no server affinity for a user or organization to a specific application server 900. In some such implementations, an interface system implementing a load balancing function (for example, an F5 Big-IP load balancer) is communicably coupled between the application servers 900 and the user systems 912 to distribute requests to the application servers 900. In one implementation, the load balancer uses a least-connections algorithm to route user requests to the application servers 900. Other examples of load balancing algorithms, such as round robin and observed-response-time, also can be used. For example, in some instances, three consecutive requests from the same user could hit three different application servers 900, and three requests from different users could hit the same application server 900. In this manner, by way of example, system 816 can be a multi-tenant system in which system 816 handles storage of, and access to, different objects, data and applications across disparate users and organizations.

In one example storage use case, one tenant can be a company that employs a sales force where each salesperson uses system 816 to manage aspects of their sales. A user can maintain contact data, leads data, customer follow-up data, performance data, goals and progress data, etc., all applicable to that user's personal sales process (for example, in tenant database 822). In an example of a MTS arrangement, because all of the data and the applications to access, view, modify, report, transmit, calculate, etc., can be maintained and accessed by a user system 912 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 816 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 816 also can maintain system level data usable by multiple tenants or other data. Such system level data can include industry reports, news, postings, and the like that are sharable among tenants.

In some implementations, the user systems 912 (which also can be client systems) communicate with the application servers 900 to request and update system-level and tenant-level data from the system 816. Such requests and updates can involve sending one or more queries to tenant database 822 or system database 824. The system 816 (for example, an application server 900 in the system 816) can automatically generate one or more SQL statements (for example, one or more SQL queries) designed to access the desired information. System database 824 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10A:
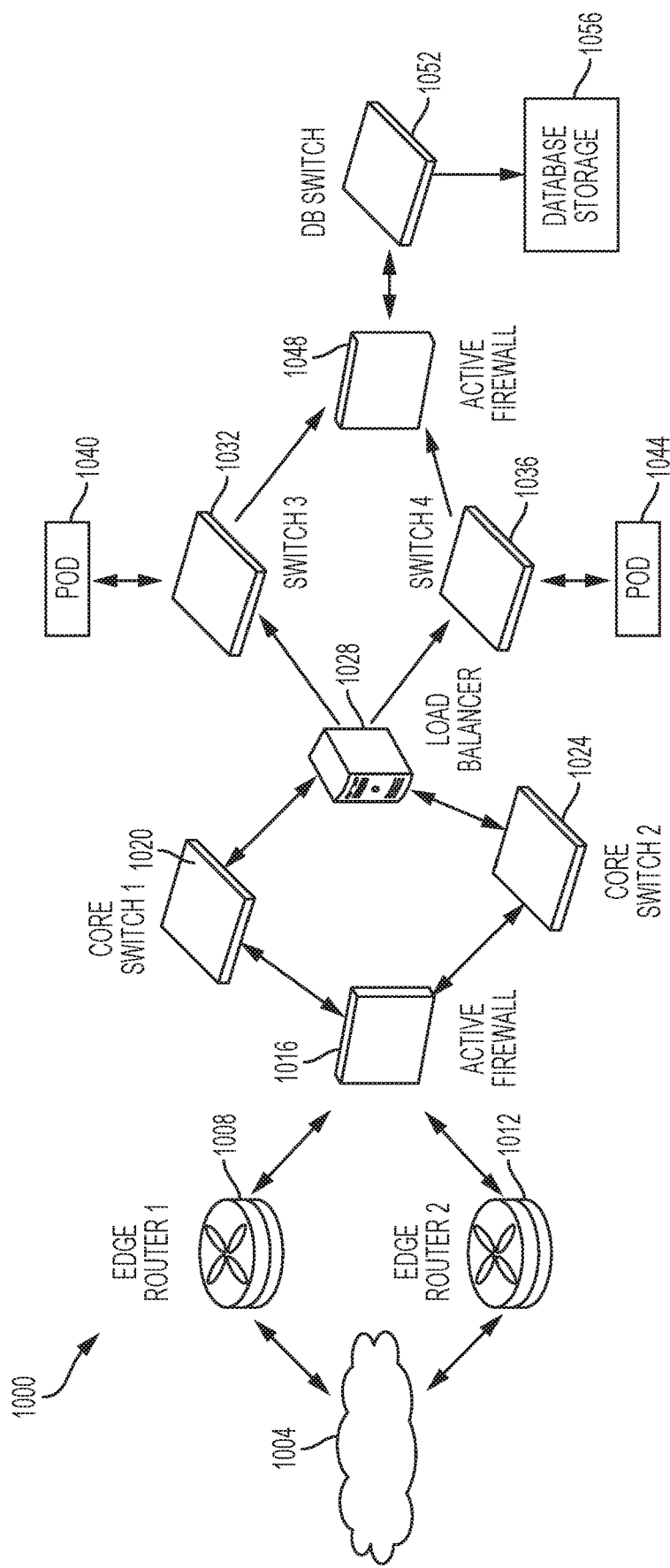
FIG. 10A shows a system diagram illustrating example architectural components of an on-demand database service environment according to some implementations.

FIG. 10A shows a system diagram illustrating example architectural components of an on-demand database service environment 1000 according to some implementations. A client machine communicably connected with the cloud 1004, generally referring to one or more networks in combination, as described herein, can communicate with the on-demand database service environment 1000 via one or more edge routers 1008 and 1012. A client machine can be any of the examples of user systems 12 described above. The edge routers can communicate with one or more core switches 1020 and 1024 through a firewall 1016. The core switches can communicate with a load balancer 1028, which can distribute server load over different pods, such as the pods 1040 and 1044. The pods 1040 and 1044, which can each include one or more servers or other computing resources, can perform data processing and other operations used to provide on-demand services. Communication with the pods can be conducted via pod switches 1032 and 1036. Components of the on-demand database service environment can communicate with database storage 1056 through a database firewall 1048 and a database switch 1052.

Figure 10B:
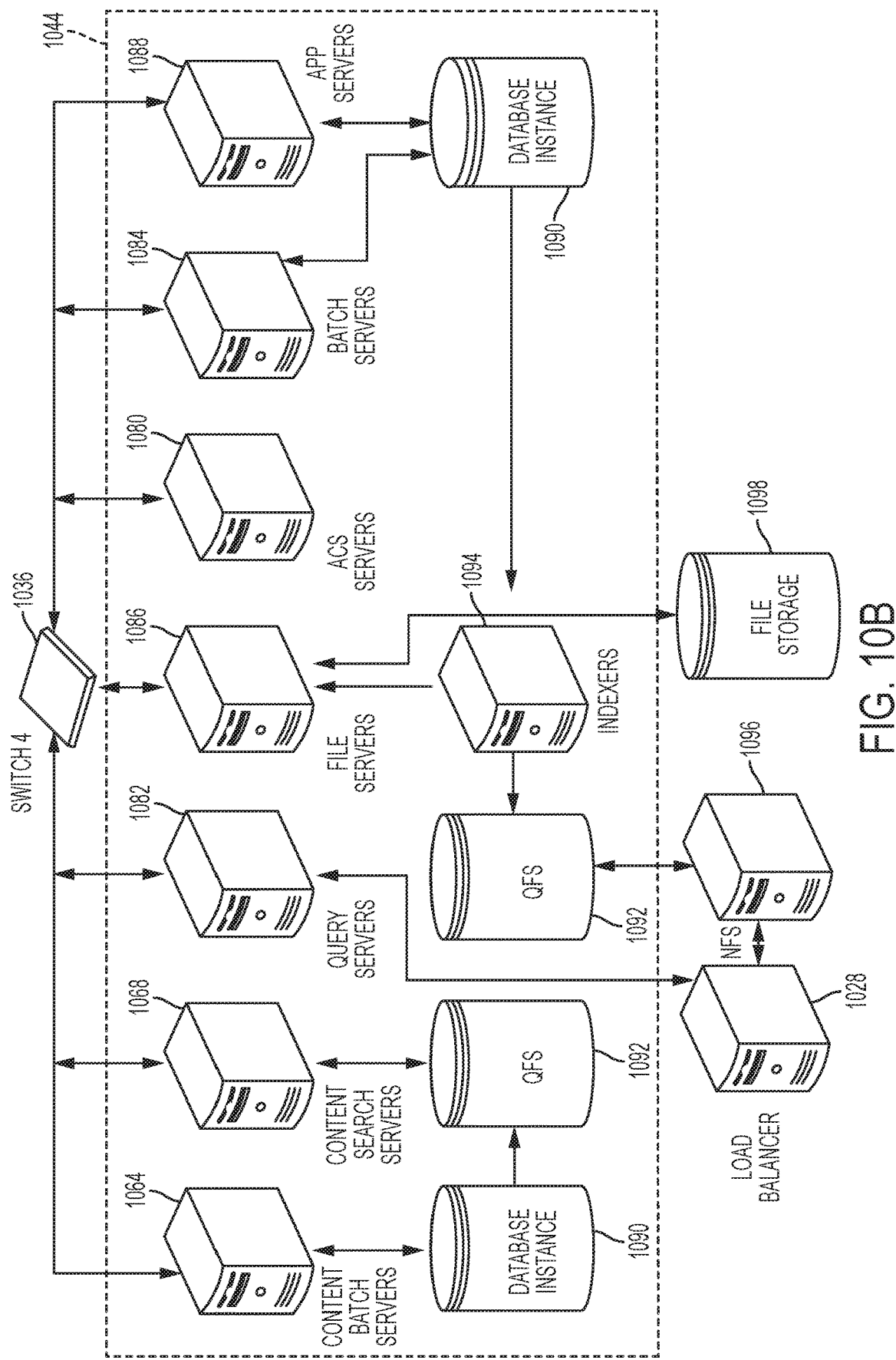
FIG. 10B shows a system diagram further illustrating example architectural components of an on-demand database service environment according to some implementations.

As shown in FIGS. 10A and 10B, accessing an on-demand database service environment can involve communications transmitted among a variety of different hardware or software components. Further, the on-demand database service environment 1000 is a simplified representation of an actual on-demand database service environment. For example, while only one or two devices of each type are shown in FIGS. 10A and 10B, some implementations of an on-demand database service environment can include anywhere from one to several devices of each type. Also, the on-demand database service environment need not include each device shown in FIGS. 10A and 10B, or can include additional devices not shown in FIGS. 10A and 10B.

Additionally, it should be appreciated that one or more of the devices in the on-demand database service environment 1000 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 1004 is intended to refer to a data network or multiple data networks, often including the Internet. Client machines communicably connected with the cloud 1004 can communicate with other components of the on-demand database service environment 1000 to access services provided by the on-demand database service environment. For example, client machines can access the on-demand database service environment to retrieve, store, edit, or process information. In some implementations, the edge routers 1008 and 1012 route packets between the cloud 1004 and other components of the on-demand database service environment 1000. For example, the edge routers 1008 and 1012 can employ the Border Gateway Protocol (BGP). The BGP is the core routing protocol of the Internet. The edge routers 1008 and 1012 can maintain a table of IP networks or 'prefixes', which designate network reachability among autonomous systems on the Internet.

In some implementations, the firewall 1016 can protect the inner components of the on-demand database service environment 1000 from Internet traffic. The firewall 1016 can block, permit, or deny access to the inner components of the on-demand database service environment 1000 based upon a set of rules and other criteria. The firewall 1016 can act as one or more of a packet filter, an application gateway, a stateful filter, a proxy server, or any other type of firewall.

In some implementations, the core switches 1020 and 1024 are high-capacity switches that transfer packets within the on-demand database service environment 1000. The core switches 1020 and 1024 can be configured as network bridges that quickly route data between different components within the on-demand database service environment. In some implementations, the use of two or more core switches 1020 and 1024 can provide redundancy or reduced latency.

In some implementations, the pods 1040 and 1044 perform the core data processing and service functions provided by the on-demand database service environment. Each pod can include various types of hardware or software computing resources. An example of the pod architecture is discussed in greater detail with reference to FIG. 10B. In some implementations, communication between the pods 1040 and 1044 is conducted via the pod switches 1032 and 1036. The pod switches 1032 and 1036 can facilitate communication between the pods 1040 and 1044 and client machines communicably connected with the cloud 1004, for example via core switches 1020 and 1024. Also, the pod switches 1032 and 1036 may facilitate communication between the pods 1040 and 1044 and the database storage 1056. In some implementations, the load balancer 1028 can distribute workload between the pods 1040 and 1044. Balancing the on-demand service requests between the pods can assist in improving the use of resources, increasing throughput, reducing response times, or reducing overhead. The load balancer 1028 may include multilayer switches to analyze and forward traffic.

In some implementations, access to the database storage 1056 is guarded by a database firewall 1048. The database firewall 1048 can act as a computer application firewall operating at the database application layer of a protocol stack. The database firewall 1048 can protect the database storage 1056 from application attacks such as structure query language (SQL) injection, database rootkits, and unauthorized information disclosure. In some implementations, the database firewall 1048 includes a host using one or more forms of reverse proxy services to proxy traffic before passing it to a gateway router. The database firewall 1048 can inspect the contents of database traffic and block certain content or database requests. The database firewall 1048 can work on the SQL application level atop the TCP/IP stack, managing applications' connection to the database or SQL management interfaces as well as intercepting and enforcing packets traveling to or from a database network or application interface.

In some implementations, communication with the database storage 1056 is conducted via the database switch 1052. The multi-tenant database storage 1056 can include more than one hardware or software components for handling database queries. Accordingly, the database switch 1052 can direct database queries transmitted by other components of the on-demand database service environment (for example, the pods 1040 and 1044) to the correct components within the database storage 1056. In some implementations, the database storage 1056 is an on-demand database system shared by many different organizations as described above with reference to FIG. 8 and FIG. 9.

FIG. 10B shows a system diagram further illustrating example architectural components of an on-demand database service environment according to some implementations. The pod 1044 can be used to render services to a user of the on-demand database service environment 1000. In some implementations, each pod includes a variety of servers or other systems. The pod 1044 includes one or more content batch servers 1064, content search servers 1068, query servers 1082, file force servers 1086, access control system (ACS) servers 1080, batch servers 1084, and app servers 1088. The pod 1044 also can include database instances 1090, quick file systems (QFS) 1092, and indexers 1094. In some implementations, some or all communication between the servers in the pod 1044 can be transmitted via the switch 1036.

In some implementations, the app servers 1088 include a hardware or software framework dedicated to the execution of procedures (for example, programs, routines, scripts) for supporting the construction of applications provided by the on-demand database service environment 1000 via the pod 1044. In some implementations, the hardware or software framework of an app server 1088 is configured to execute operations of the services described herein, including performance of the blocks of various methods or processes described herein. In some alternative implementations, two or more app servers 1088 can be included and cooperate to perform such methods, or one or more other servers described herein can be configured to perform the disclosed methods.

The content batch servers 1064 can handle requests internal to the pod. Some such requests can be long-running or not tied to a particular customer. For example, the content batch servers 1064 can handle requests related to log mining, cleanup work, and maintenance tasks. The content search servers 1068 can provide query and indexer functions. For example, the functions provided by the content search servers 1068 can allow users to search through content stored in the on-demand database service environment. The file force servers 1086 can manage requests for information stored in the File force storage 1098. The File force storage 1098 can store information such as documents, images, and basic large objects (BLOBs). By managing requests for information using the file force servers 1086, the image footprint on the database can be reduced. The query servers 1082 can be used to retrieve information from one or more file storage systems. For example, the query system 1082 can receive requests for information from the app servers 1088 and transmit information queries to the NFS 1096 located outside the pod.

The pod 1044 can share a database instance 1090 configured as a multi-tenant environment in which different organizations share access to the same database. Additionally, services rendered by the pod 1044 may call upon various hardware or software resources. In some implementations, the ACS servers 1080 control access to data, hardware resources, or software resources. In some implementations, the batch servers 1084 process batch jobs, which are used to run tasks at specified times. For example, the batch servers 1084 can transmit instructions to other servers, such as the app servers 1088, to trigger the batch jobs.

In some implementations, the QFS 1092 is an open source file storage system available from Sun Microsystems® of Santa Clara, Calif. The QFS can serve as a rapid-access file storage system for storing and accessing information available within the pod 1044. The QFS 1092 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 1068 or indexers 1094 to identify, retrieve, move, or update data stored in the network file storage systems 1096 or other storage systems.

In some implementations, one or more query servers 1082 communicate with the NFS 1096 to retrieve or update information stored outside of the pod 1044. The NFS 1096 can allow servers located in the pod 1044 to access information to access files over a network in a manner similar to how local storage is accessed. In some implementations, queries from the query servers 1082 are transmitted to the NFS 1096 via the load balancer 1028, which can distribute resource requests over various resources available in the on-demand database service environment. The NFS 1096 also can communicate with the QFS 1092 to update the information stored on the NFS 1096 or to provide information to the QFS 1092 for use by servers located within the pod 1044.

In some implementations, the pod includes one or more database instances 1090. The database instance 1090 can transmit information to the QFS 1092. When information is transmitted to the QFS, it can be available for use by servers within the pod 1044 without using an additional database call. In some implementations, database information is transmitted to the indexer 1094. Indexer 1094 can provide an index of information available in the database 1090 or QFS 1092. The index information can be provided to file force servers 1086 or the QFS 1092.

Figure 11:
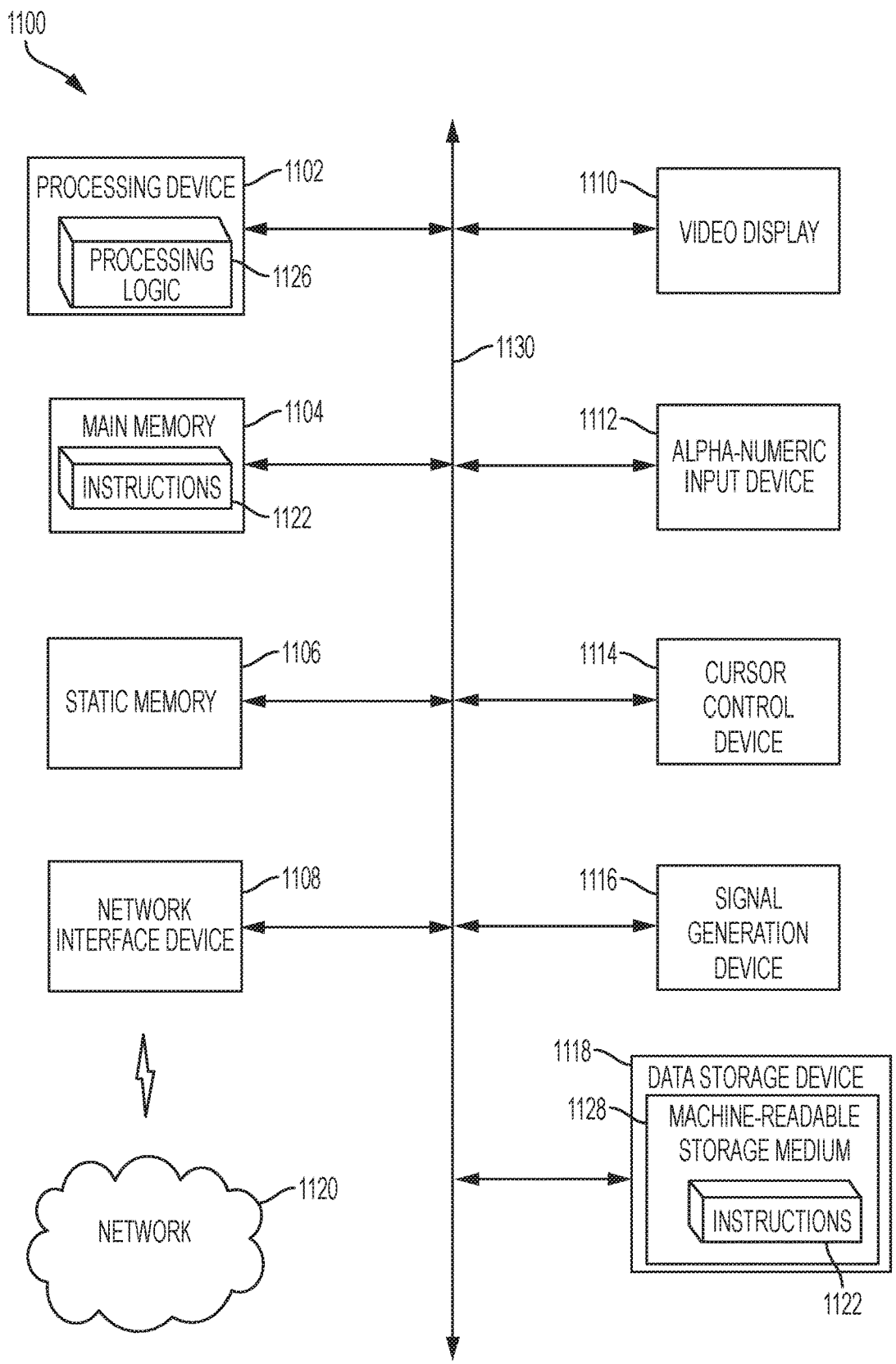
FIG. 11 illustrates a diagrammatic representation of a machine in the exemplary form of a computer system within which a set of instructions, for causing the machine to perform any one or more of the methodologies discussed herein, may be executed.

FIG. 11 illustrates a diagrammatic representation of a machine in the exemplary form of a computer system 1100 within which a set of instructions, for causing the machine to perform any one or more of the methodologies discussed herein, may be executed. The system 1100 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device (processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)), and a data storage device 1118, which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a computer-readable medium 1128 on which is stored one or more sets of instructions 1122 (e.g., instructions of in-memory buffer service 114) embodying any one or more of the methodologies or functions described herein. The instructions 1122 may also reside, completely or at least partially, within the main memory 1104 and/or within processing logic 1126 of the processing device 1102 during execution thereof by the computer system 1100, the main memory 1104 and the processing device 1102 also constituting computer-readable media. The instructions may further be transmitted or received over a network 1120 via the network interface device 1108.

While the computer-readable storage medium 1128 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing recommendations to modify an application provided by a cloud-based computing system and used by end users of an organization that is part of the cloud-based computing system, the method comprising:

monitoring, at a clickstream monitoring module, a clickstream generated by each of a plurality of end users as each of the plurality of end users interacts with the application;

generating a set of clickstream data for each of the plurality of end users, wherein each set of clickstream data indicates a path of interaction with features of the application by a particular end user;

processing the plurality of sets of clickstream data, at an analytics engine;

extracting usage patterns for the plurality of end users, based on processing the plurality of sets of clickstream data, that indicate how the plurality of end users globally interact with different features of the application during usage of the application, wherein the extracted usage patterns indicate which features the plurality of end users interact with and in what order;

generating, at an artificial intelligence engine based on the extracted usage patterns, at least one recommendation for modifying one or more features of the application; and tailoring the application for use by the plurality of end users in view of the extracted usage patterns.

2. The method of claim 1, wherein the at least one recommendation suggests modifications to at least one feature of the application:
that determines which fields of the application are presented within the application, or
an order in which the fields of the application are presented to the end users of the application.

3. The method of claim 1, wherein the at least one recommendation suggests modifications to an existing process by which the end users interact with the application to result in a new process by which the end users interact with the application to improve or simplify the end users interaction with the application.

4. The method of claim 1, wherein the at least one recommendation suggests a new process flow by which the end users interact with the application.

5. The method of claim 1, wherein the at least one recommendation suggests modifications to an existing process workflow by which the end users interact with the application to result in a new process workflow by which the end users interact with the application to reduce a number of steps required to perform or complete a task, a job or an action when the end users interact with the application.

6. The method of claim 1, wherein the at least one recommendation suggests modifications to at least one feature of the application.

7. The method of claim 1, wherein the at least one recommendation suggests modifications to at least one feature of the application:
that determines whether an input control of the application is presented within the application, or
an order in which that input control of the application is presented to the end users of the application.

8. The method of claim 1, wherein the at least one recommendation suggests modifications to at least one feature of the application:
that determines whether a navigational component of the application is presented within the application, or
an order in which that navigational component of the application is presented to the end users of the application.

9. The method of claim 1, wherein the at least one recommendation suggests modifications to at least one feature of the application:
   that determines whether an informational component of the application is presented within the application, or
   an order in which that informational component of the application is presented to the end users of the application.

10. The method of claim 1, wherein the at least one recommendation suggests modifications to at least one feature of the application:
   that determines whether a container of the application is presented within the application, or
   an order in which that container of the application is presented to the end users of the application.

11. The method of claim 1, wherein the at least one recommendation suggests modifications to at least one feature of the application:
   that determines whether a page of the application is presented within the application, or
   an order in which that page of the application is presented to the end users of the application.

12. A cloud-based computing system that hosts a plurality of organizations, comprising:
   an organization having a plurality of end users, wherein the cloud-based computing system provides an application that the plurality of end users interact with; and
   an automated, intelligent application process development module that when executed by a hardware-based processing system is configurable to cause:
       monitoring, at a clickstream monitoring module, a clickstream generated by each of a plurality of end users of the organization as each of the plurality of end users interacts with the application to generate a set of clickstream data for that particular end user, wherein each set of clickstream data indicates a path of interaction with features of the application by a particular end user;
       processing the plurality of sets of clickstream data, at an analytics engine;
       extracting usage patterns for the plurality of end users, based on processing the plurality of sets of clickstream data, that indicate how the plurality of end users globally interact with different features of the application during usage of the application, wherein the extracted usage patterns indicate which features the plurality of end users interact with and in what order;
       generating, at an artificial intelligence engine based on the extracted usage patterns, at least one recommendation for modifying one or more features of the application; and
       tailoring the application for use by the plurality of end users in view of the extracted usage patterns.

13. The cloud-based computing system according to claim 12, wherein the at least one recommendation suggests modifications to at least one feature of the application:
   that determines which fields of the application are presented within the application, or
   an order in which the fields of the application are presented to the end users of the application.

14. The cloud-based computing system according to claim 12, wherein the at least one recommendation suggests modifications to an existing process by which the end users interact with the application to result in a new process by which the end users interact with the application to improve or simplify the end users interaction with the application.

15. The cloud-based computing system according to claim 12, wherein the at least one recommendation suggests a new process flow by which the end users interact with the application.

16. The cloud-based computing system according to claim 12, wherein the at least one recommendation suggests modifications to an existing process workflow by which the end users interact with the application to result in a new process workflow by which the end users interact with the application to reduce a number of steps required to perform or complete a task, a job or an action when the end users interact with the application.

17. The cloud-based computing system according to claim 12, wherein the at least one recommendation suggests modifications to at least one feature of the application.

18. The cloud-based computing system according to claim 12, wherein the at least one recommendation suggests modifications to at least one feature of the application:
   that determines whether an input control, navigation component, informational component, container, or page of the application is presented within the application, or
   an order in which that input control, navigation component, informational component, container, or page of the application is presented to the end users of the application.

19. A system comprising at least one hardware-based processor and memory, wherein the memory comprises processor-executable instructions encoded on a non transitory processor-readable media, wherein the processor-executable instructions, when executed by the processor, are configurable to cause:
   monitoring, at a clickstream monitoring module, a clickstream generated by each of a plurality of end users of an organization as each of the plurality of end users interacts with an application provided by a cloud-based computing system;
   generating a set of clickstream data for each of the plurality of end users, wherein each set of clickstream data indicates a path of interaction with features of the application by a particular end user;
   processing the plurality of sets of clickstream data, at an analytics engine;
   extracting usage patterns for the plurality of end users, based on processing the plurality of sets of clickstream data, that indicate how the plurality of end users globally interact with different features of the application during usage of the application, wherein the extracted usage patterns indicate which features the plurality of end users interact with and in what order;
   generating, at an artificial intelligence engine based on the extracted usage patterns, at least one recommendation for modifying one or more features of the application; and
   tailoring the application for use by the plurality of end users in view of the extracted usage patterns.

* * * * *